(12) United States Patent
Wernaers et al.

(10) Patent No.: US 9,131,517 B2
(45) Date of Patent: Sep. 8, 2015

(54) ACHIEVING BEST EFFORT PERFORMANCE WITH INTERFERING COMMUNICATIONS SYSTEM EQUIPMENT

(75) Inventors: Yves Wernaers, Teralfene (BE); Eric Finco, Guécélard (FR); Frank Heinle, Nuremberg (DE); Bo Lincoln, Lund (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 472 days.

(21) Appl. No.: 13/584,230

(22) Filed: Aug. 13, 2012

(65) Prior Publication Data

US 2014/0046459 A1    Feb. 13, 2014

(51) Int. Cl.
*G05B 13/02*    (2006.01)
*H04W 72/12*    (2009.01)

(52) U.S. Cl.
CPC .................................. *H04W 72/1215* (2013.01)

(58) Field of Classification Search
None
See application file for complete search history.

(56) References Cited

U.S. PATENT DOCUMENTS

| | | | |
|---|---|---|---|
| 7,787,398 B2 * | 8/2010 | Liu et al. ........................ | 370/254 |
| 2002/0120488 A1 * | 8/2002 | Bril et al. ........................... | 705/9 |
| 2004/0228350 A1 | 11/2004 | Kuroda et al. | |
| 2005/0059347 A1 | 3/2005 | Haartsen | |
| 2008/0139200 A1 * | 6/2008 | Zhu et al. .................... | 455/426.1 |
| 2008/0311875 A1 * | 12/2008 | Jakonen et al. ................ | 455/295 |
| 2009/0061849 A1 * | 3/2009 | Yang et al. ................. | 455/426.1 |
| 2011/0238774 A1 | 9/2011 | Maeda | |

FOREIGN PATENT DOCUMENTS

| | | |
|---|---|---|
| JP | 2003273881 A1 | 9/2003 |
| JP | 2009224827 A | 10/2009 |
| WO | 2011098373 A1 | 8/2011 |

* cited by examiner

*Primary Examiner* — Mohammad Ali
*Assistant Examiner* — Bernard G Lindsay
(74) *Attorney, Agent, or Firm* — Leffler Intellectual Property Law, PLLC; Kenneth B. Leffler

(57) ABSTRACT

Primary and secondary apparatuses avoid concurrent performance of activities, wherein the secondary apparatus has a best and possibly different worst case minimum amounts of time required to perform activity. The primary apparatus ascertains a first future moment when it will become inactive and ascertains whether its upcoming period of inactivity will not be less than the secondary apparatus' best case minimum amount of time required to perform activity. If not, the primary apparatus asserts, in advance of the first future moment, an inactivity indicator signal indicating its upcoming inactivity. The interval between assertion of the inactivity indicator signal and the first future moment is greater than or equal to a difference between the secondary apparatus' worst and best case minimum amounts of time required to perform activity.

32 Claims, 10 Drawing Sheets

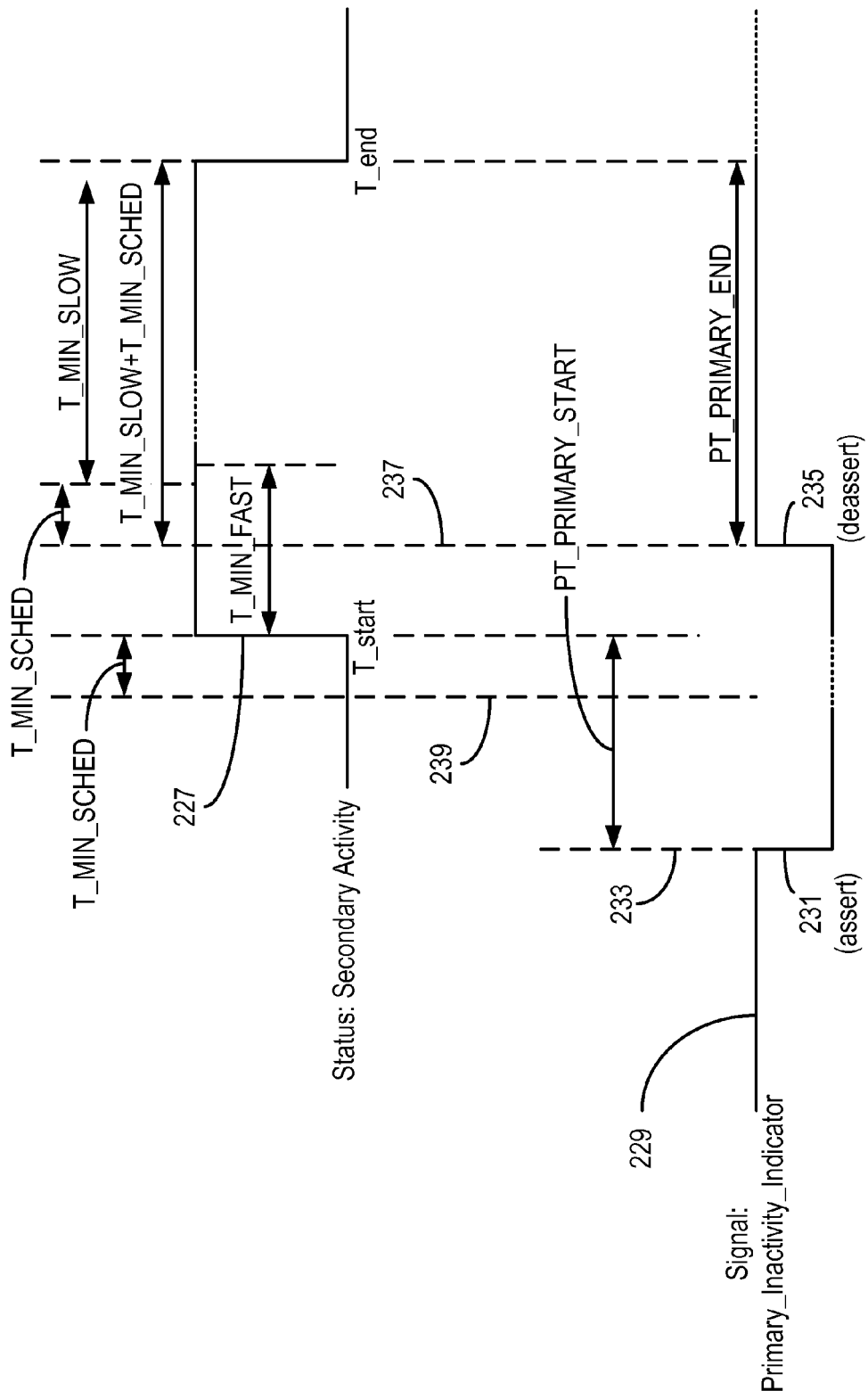

ACHIEVING BEST EFFORT PERFORMANCE WITH INTERFERING COMMUNICATIONS SYSTEM EQUIPMENT

BACKGROUND

The invention relates to electronic apparatuses including but not limited to radio communication apparatuses, and more particularly to the operation of multiple apparatuses whose concurrent operation creates the potential of one interfering with the other.

In the past few decades, progress in radio and Very Large Scale Integrated circuit (VLSI) technology has fostered widespread use of radio communications in consumer applications. Portable devices, such as mobile radio communication devices, can now be produced having acceptable cost, size and power consumption. After the worldwide success of mobile telephony in licensed bands, capacity limitations and huge license fees have spurred an interest in radio applications operating in the unlicensed bands. For the past few years, systems such as Wireless Local Area Networks (WLAN) operating in accordance with the IEEE 802.11 standards (commercialized under the name "WiFi") and Wireless Personal Area Networks operating in accordance with the Bluetooth standards (IEEE 802.15 standards) have been increasingly deployed in the unlicensed 2.4 GHz Industrial, Scientific, Medical (ISM) frequency band. Other radio technology, such as Global Positioning System (GPS) equipment (operating at 1.57542 GHz and 1.2276 GHz) and Global Navigation Satellite System (GNAS) equipment (operating at approximately 1.602 GHz and 1.246 GHz), are now also commonly in use.

As more and more communications systems are integrated into a single device, such as a mobile terminal of some sort, the probability that systems will interfere with one another increases. In order to achieve seemingly simultaneous operation without significant user impact, the interfering systems perform time multiplexing, by which they take turns utilizing the radio spectrum in order to avoid having one system's operation interfere with that of another. This calls for some exchange of state information between the potentially interfering systems. In many instances, one of the communication systems will have priority over the other. The system having higher priority is herein referred to as the Primary communication system (or more generically the Primary apparatus, since the various inventive aspects are not limited to only communication systems). The system having the lower priority is herein referred to as the Secondary communication system (or more generically, the Secondary apparatus, since the various inventive aspects are not limited to only communication systems). The principle of operation between Primary and Secondary communication systems is that the Primary communication system's operation can take priority over that of the Secondary communication system unless this would cause a connection loss on the Secondary communication system.

Examples of such communication systems are:
  Third Generation Partnership Project (3GPP) Long Term Evolution (LTE) B7/B40 (Primary) communications equipment multiplexing with Wireless LAN communications equipment (Secondary)
  3GPP LTE B7/B40 communications equipment (Primary) multiplexing with Bluetooth communications equipment (Secondary)
  3GPP LTE B7/B40 communications equipment (Primary) multiplexing with GPS/GNSS radio navigation equipment (Secondary)

Conventional strategies for coordinating operations between Primary and Secondary equipment are characterized by one or more drawbacks such as:
  a requirement for complex signaling between Primary and Secondary communications equipment.
  a requirement for alignment/standardization of the interface protocol to be used between the Primary and Secondary equipment. (Such alignment/standardization may be difficult to achieve because the several systems may be designed by groups that are completely independent of one another.)
  cooperative behavior by one of the systems that is reactive to what the other one is doing, thereby creating inefficiencies in resource utilization (i.e., use of spectral and/or time resources).

It is therefore desirable to provide one or more mechanisms whereby interfering communications systems, and more generally any interfering apparatuses, can cooperate with one another so as to avoid having one interfere with the other, while avoiding one or more of the drawbacks associated with conventional strategies.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a primary apparatus, wherein activity of the primary apparatus causes interference that disturbs activity of a secondary apparatus and/or activity of the secondary apparatus causes interference that disturbs activity of the primary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity. Such operation includes ascertaining a first future moment when an activity status of the primary apparatus will change from active to inactive and ascertaining whether a duration of primary apparatus inactivity beginning at the first future moment will not be less than the secondary apparatus' best case minimum amount of time required to perform activity. In response to ascertaining that the duration of primary apparatus inactivity beginning at the first future moment will not be less than the secondary apparatus' best case minimum amount of time required to perform activity, a primary apparatus inactivity signal is asserted at a moment in advance of the first future moment, wherein the primary apparatus inactivity signal indicates upcoming primary apparatus inactivity scheduled to begin at the first future moment in time. Operation is further characterized in that an amount of time between the moment in advance of the first future moment and the first future moment is equal to a primary pre-notice start time that is greater than or equal to the secondary apparatus' worst case minimum amount of time required to perform activity minus the secondary apparatus' best case minimum amount of time required to perform activity.

In another aspect of some embodiments consistent with the invention, the primary pre-notice start time is greater than or equal to a sum of a secondary apparatus activity scheduling time and the secondary apparatus' worst case minimum amount of time required to perform activity minus the secondary apparatus' best case minimum amount of time required to perform activity.

In another aspect of some embodiments consistent with the invention, operation also includes ascertaining a second future moment when an activity status of the primary apparatus will change from inactive to active, and deasserting the primary apparatus inactivity signal at a moment in advance of the second future moment, wherein deassertion of the primary apparatus inactivity signal indicates upcoming primary apparatus activity scheduled to begin at the second future moment in time. Such embodiments are further characterized in that an amount of time between the moment in advance of the second future moment and the second future moment is equal to a primary pre-notice end time that is greater than or equal to a sum of the secondary apparatus activity scheduling time and the secondary apparatus' worst case minimum amount of time required to perform activity.

In another aspect of some embodiments consistent with the invention, the primary pre-notice start time is greater than or equal to a sum of the secondary apparatus activity scheduling time and the secondary apparatus' worst case minimum amount of time required to perform activity.

In another aspect of some embodiments consistent with the invention, operation includes detecting assertion of a secondary activity request signal that indicates a need for the secondary radio transceiver to become active at a third future moment and scheduling the primary apparatus to become inactive at the third future moment in time. Such embodiments are further characterized in that an amount of time between detecting assertion of the secondary activity request signal and the third future moment in time is greater than or equal to an amount of time required for the primary apparatus to schedule the primary apparatus to become inactive at the third future moment in time. In some but not necessarily all of these embodiments, operation also includes ascertaining whether to respond to the assertion of the secondary activity request signal by scheduling the primary apparatus to become inactive at the third future moment in time; and in response to ascertaining that the primary apparatus will respond to the assertion of the secondary activity request signal by scheduling the primary apparatus to become inactive at the third future moment in time, asserting the primary apparatus inactivity signal at a moment in advance of the third future moment. Further, in some but not necessarily all of these embodiments, operation also includes detecting deassertion of the secondary activity request signal that indicates that the secondary apparatus will be able to become inactive at a fourth future moment in time; and in response to detecting deassertion of the secondary activity request, enabling the primary apparatus to become active at or after the fourth future moment in time.

In accordance with one aspect of the present invention, the foregoing and other objects are achieved in methods and apparatuses for operating a secondary apparatus, wherein activity of the secondary apparatus causes interference that disturbs activity of a primary apparatus and/or activity of the primary apparatus causes interference that disturbs activity of the secondary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity. Such operation includes detecting assertion of a primary apparatus inactivity signal at a moment in advance of a first future moment, wherein the primary apparatus inactivity signal indicates upcoming primary apparatus inactivity scheduled to begin at the first future moment in time; and scheduling performance of at least one activity to begin at the first future moment in time.

In another aspect of some embodiments consistent with the invention, operation includes detecting deassertion of the primary apparatus status signal, wherein deassertion of the primary apparatus inactivity signal indicates upcoming primary apparatus activity scheduled to begin at a second future moment in time; and in response to detecting deassertion of the primary apparatus status signal, scheduling performance of a last activity that will end no later than the second future moment in time. In some but not necessarily all of these embodiments, assertion of the primary apparatus inactivity signal and deassertion of the primary apparatus inactivity signal are both detected prior to the first future moment in time; and the at least one activity scheduled to begin at the first future moment in time consists of one or more activities, each lasting no longer than the best case minimum amount of time required to perform activity. In some others but not necessarily all of these embodiments, assertion of the primary apparatus inactivity signal and deassertion of the primary apparatus inactivity signal are both detected prior to the first future moment in time; and the at least one activity scheduled to begin at the first future moment in time consists of one activity that lasts no longer than the worst case minimum amount of time required to perform activity. In yet some others but not necessarily all of these embodiments, deassertion of the primary apparatus inactivity signal is detected after the first future moment in time; and the last activity is an activity whose performance requires an amount of time equal to the worst case minimum amount of time required to perform activity.

In another aspect of some embodiments consistent with the invention, operation includes ascertaining that there exists a need to become active at a third future moment in time, and in response to said ascertaining, asserting a secondary activity request signal at a moment in advance of the third future moment in time. Such embodiments are further characterized in that an amount of time between the moment in advance of the third future moment in time and the third future moment in time is greater than or equal to a primary apparatus activity scheduling time. In some but not necessarily all of these embodiments, operation further comprises ascertaining that a need to be active will end at a fourth future moment in time, and in response to said ascertaining, deasserting the secondary activity request signal at a moment in advance of the fourth future moment in time, wherein an amount of time between the moment in advance of the fourth future moment in time and the fourth future moment in time is greater than or equal to the primary apparatus activity scheduling time. In some others but not necessarily all of these embodiments, operation includes monitoring the primary apparatus inactivity signal to detect whether the primary apparatus will be inactive at the third future moment in time.

BRIEF DESCRIPTION OF THE DRAWINGS

The objects and advantages of the invention will be understood by reading the following detailed description in conjunction with the drawings in which:

FIGS. 2a, 2b, and 2c are each signal/timing diagrams illustrating aspects of embodiments consistent with the invention.

DETAILED DESCRIPTION

Figure 1:
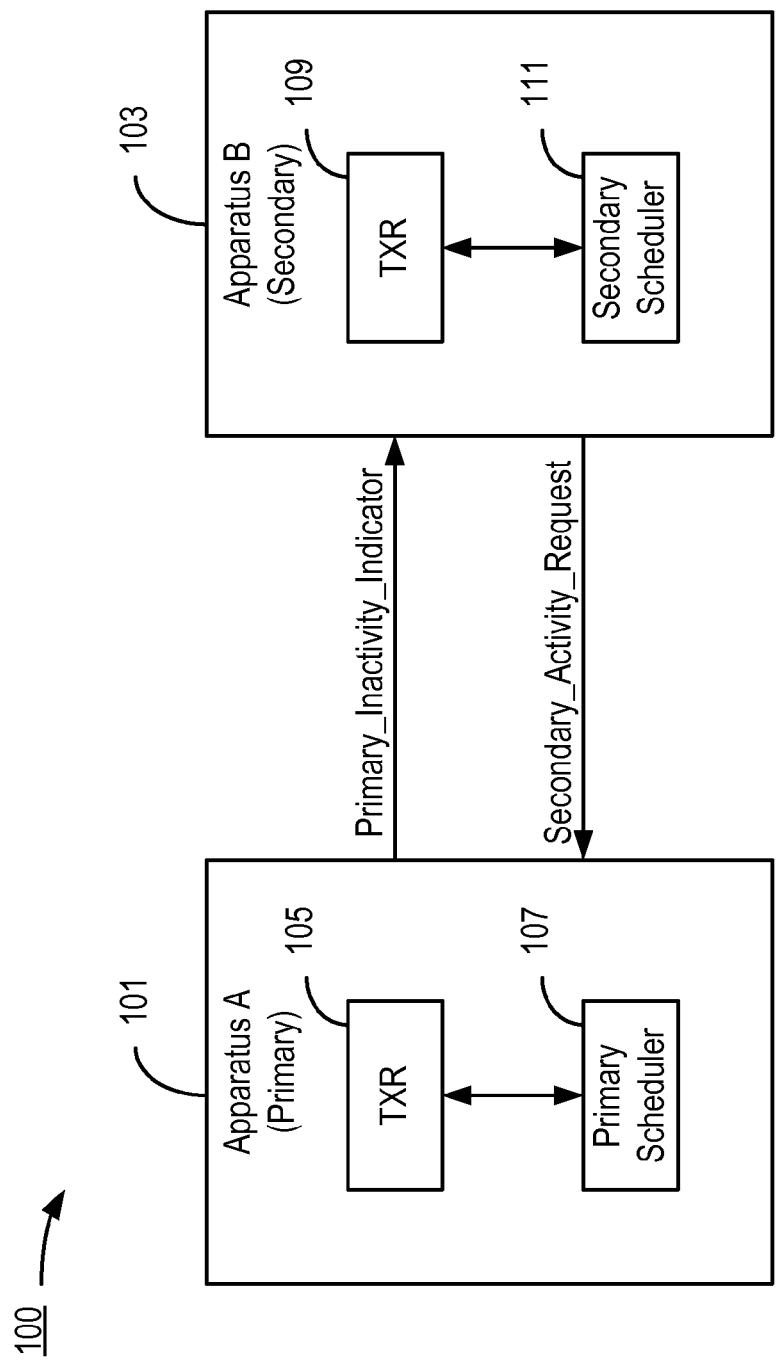
FIG. 1 is a block diagram of an exemplary embodiment of a system in which interfering primary and secondary apparatuses employ aspects of embodiments consistent with the invention to achieve efficient best effort performance.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

FIG. 1 is a block diagram of an exemplary embodiment of a system 100 in which interfering primary and secondary apparatuses employ aspects of embodiments consistent with the invention to achieve efficient best effort performance. In this example, Apparatus A 101 is primary and Apparatus B 103 is secondary. These apparatuses can, for example, cause mutual interference by virtue of their each being transceiver equipment that utilize a shared transmission medium. It should be understood, however, that this is not the only mechanism by which apparatuses can cause one another interference, regardless of whether they are transceiver equipment. But keeping with this illustrative example, Apparatus A 101 includes a transceiver (TXR) 105 and a primary scheduler 107. The Apparatus B 103 similarly includes a transceiver 109 and a secondary scheduler 111.

In order to ensure that the two apparatuses 101, 103 do not attempt to perform activities (e.g., attempting to use the shared transmission medium) at the same time, their operations are coordinated. This is facilitated by means of the primary scheduler 107 generating a signal called "Primary_Inactivity_Indicator" that the secondary scheduler 111 is able to monitor and respond to. The Primary_Inactivity_Indicator, informs the secondary apparatus B 101 about Apparatus A's status with respect to whether it is active or not. The secondary apparatus B 103 can therefore plan its active states to occur when the primary apparatus A 101 will be inactive. The generation of the Primary_Inactivity_Indicator is described in greater detail below.

It will be observed that the secondary apparatus B 103 is dependent on the primary apparatus A 101 being inactive in order to plan times when the secondary apparatus B 103 can become active. In another aspect of some embodiments consistent with the invention, the secondary scheduler 111 generates a signal, herein called "Secondary_Activity_Request", that is monitored by the primary scheduler 107. The Secondary_Activity_Request provides a means by which the secondary apparatus B 103 can inform the primary apparatus A 101 of a need to perform activity (e.g., in the context of communications systems, a need to transmit or receive information). The primary scheduler 107 can thus utilize the state of the Secondary_Activity_Request to schedule its own activities in a way that allows the secondary apparatus B 103 to operate when needed without causing interference to, or receiving interference from, the primary apparatus A 101. Generation of the Secondary_Activity_Request signal is discussed in greater detail below.

The discussion will first focus on the Primary_Inactivity_Indicator, which is the means by which the primary apparatus signals its upcoming activity and upcoming inactivity. The word "upcoming" is important in the context of embodiments consistent with the invention because state changes of the Primary_Inactivity_Indicator are designed to occur in advance of the primary apparatus' actual change in state (i.e., with regard to whether it is "active" or "inactive"). By detecting that the primary apparatus A 101 will become active in advance of the primary apparatus actually becoming inactive, the secondary scheduler 111 is able to schedule activity to begin just when the primary apparatus A 101 goes inactive. Similarly, by detecting that the primary apparatus A 101 will again become active in advance of the primary apparatus A 101 actually becoming active, the secondary scheduler 111 can gracefully stop ongoing activity.

The amount of advance notice that the secondary apparatus is given about the primary apparatus' change in state (active or inactive) can be different for signaling upcoming inactivity compared to signaling upcoming activity. However, in each case, the primary and secondary apparatuses should agree on what these pre-notice times (abbreviated herein as "PT") are. The pre-notice times can be fixed values that are pre-configured in a configuration file or hard coded in the firmware/hardware. Alternatively, the pre-notice times can be negotiated between both the primary and secondary apparatuses.

Any existing real-time interface or software interface (not related to aspects described herein) can be used. Another possibility for negotiation is to utilize one or both of the signaling lines respectively denoted Primary_Inactivity_Indicator and Secondary_Activity_Request in FIG. 1. During device start-up, pre-notice time information can be communicated over these lines by means of a signaling protocol, such as but not limited to UART, I2C, and the like. After negotiation of the pre-notice time information is complete, these signals take on their "normal" (i.e., run-time) meanings as described herein.

When the primary apparatus is active and is scheduled to become inactive at a first future moment, the primary apparatus asserts the Primary_Inactivity_Indicator at a moment that is an amount of time, PT_PRIMARY_START, in advance of the first future moment in time. Similarly, when the primary apparatus is inactive and is scheduled to become active at a second future moment, the primary apparatus deasserts the Primary_Inactivity_Indicator at a moment that is an amount of time, PT_PRIMARY_END, in advance of the second future moment in time.

Figure 2A:
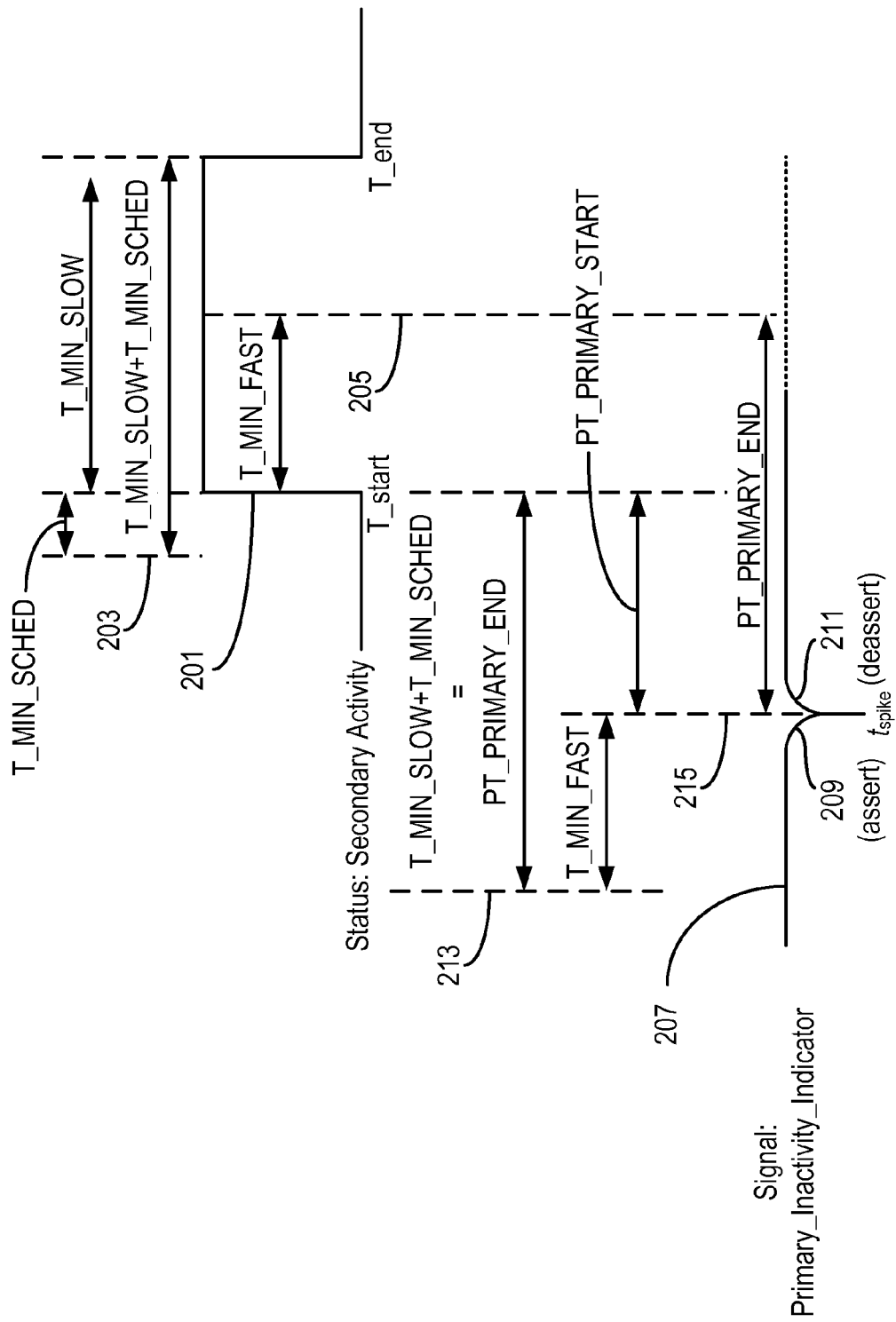

In another aspect of embodiments consistent with the invention, the pre-notice times PT_PRIMARY_START and PT_PRIMARY_END are selected in such a manner that the secondary apparatus is guaranteed an opportunity to perform some type of activity both when learning of the primary apparatus' upcoming inactivity as well as when learning of the primary apparatus' upcoming resumption of activity. FIG. 2a is a timing diagram that illustrates factors to consider when deriving suitable pre-notice times.

One factor that should be taken into consideration is that, in the general case, the minimum amount of time that the secondary apparatus requires in order to perform activity can vary. For example, when the secondary apparatus is a communication apparatus, the minimum transaction duration (e.g., sending a packet and subsequently receiving acknowledgement of its reception or lack thereof) might depend on the RF link conditions, the physical rate in use, or other parameters. For example, if the secondary apparatus is a communication device that operates in accordance with the WLAN standards, a minimum transaction duration could take a few hundred microseconds to complete when a high physical rate is used, whereas when a low rate is used it could take a few milliseconds to complete a transaction.

Assuming that there is a worst case minimum required duration (herein called "T_MIN_SLOW"), it is advantageous for the secondary apparatus to know that the duration of the primary apparatus' state of inactivity will at least be greater than or equal to this such that the secondary apparatus can utilize the time. The secondary apparatus should similarly be assured that, when the primary apparatus signals that it will resume activity, the secondary apparatus will have at least an amount of time greater than or equal to the worst case minimum transaction time in order to be able to schedule activity to take place during this time. In order to be able to do this, the following condition should be met:

$$\text{PT\_PRIMARY\_END} \geq \text{T\_MIN\_SLOW} \qquad 1.$$

This way, the secondary apparatus will know before the primary apparatus becomes inactive that the duration of inactivity will be long enough.

Since the secondary apparatus needs time to prepare the scheduling (with the scheduling time being herein represented by "T_MIN_SCHED"), the above condition should be extended to:

$$\text{PT\_PRIMARY\_END} \geq \text{T\_MIN\_SLOW} + \text{T\_MIN\_SCHED} \qquad 1.$$

$$\text{PT\_PRIMARY\_START} \geq \text{PT\_PRIMARY\_END} \qquad 2.$$

It will be observed that in embodiments conforming to conditions 1 and 2 as stated above, the pre-notice time for signaling upcoming inactivity (PT_PRIMARY_START) is at least as long as the pre-notice time for signaling upcoming activity (PT_PRIMARY_END). However, these conditions are merely exemplary. It is possible to make refinements and/or improvements, such as those presented in the following discussion.

Since the secondary apparatus has a best case minimum duration of time below which it is unable to perform any activity whatsoever (i.e., T_MIN_FAST), embodiments can be configured to guarantee the secondary apparatus that, if an upcoming primary apparatus period of inactivity is signaled, that its duration will at least be as long as T_MIN_FAST. Further this signaling can be performed in a way that informs the secondary apparatus whether the period of inactivity will be even longer than T_MIN_FAST, perhaps even at least as long as T_MIN_SLOW, thereby enabling the secondary apparatus to select from among a number of possible activities than can be performed within the upcoming activity opportunity.

To enable this type of signaling, the primary apparatus should be configured to inhibit asserting its Primary_Inactivity_Indicator signal whenever the expected duration of primary apparatus inactivity will be shorter than T_MIN_FAST. The rationale for this is that the secondary apparatus would never be able to perform any activity within this short amount of time, so there is no point in signaling its existence. With this as a restriction, the conditions for ascertaining the pre-notice times can become:

$$\text{PT\_PRIMARY\_END} \geq \text{T\_MIN\_SLOW} + \text{T\_MIN\_SCHED} \qquad 1.$$

$$\text{PT\_PRIMARY\_START} \geq \text{PT\_PRIMARY\_END} - \text{T\_MIN\_FAST} \qquad 2.$$

As mentioned above, these pre-notice times can be predefined or can be dynamically exchanged between the primary and secondary apparatuses.

Figure 2B:
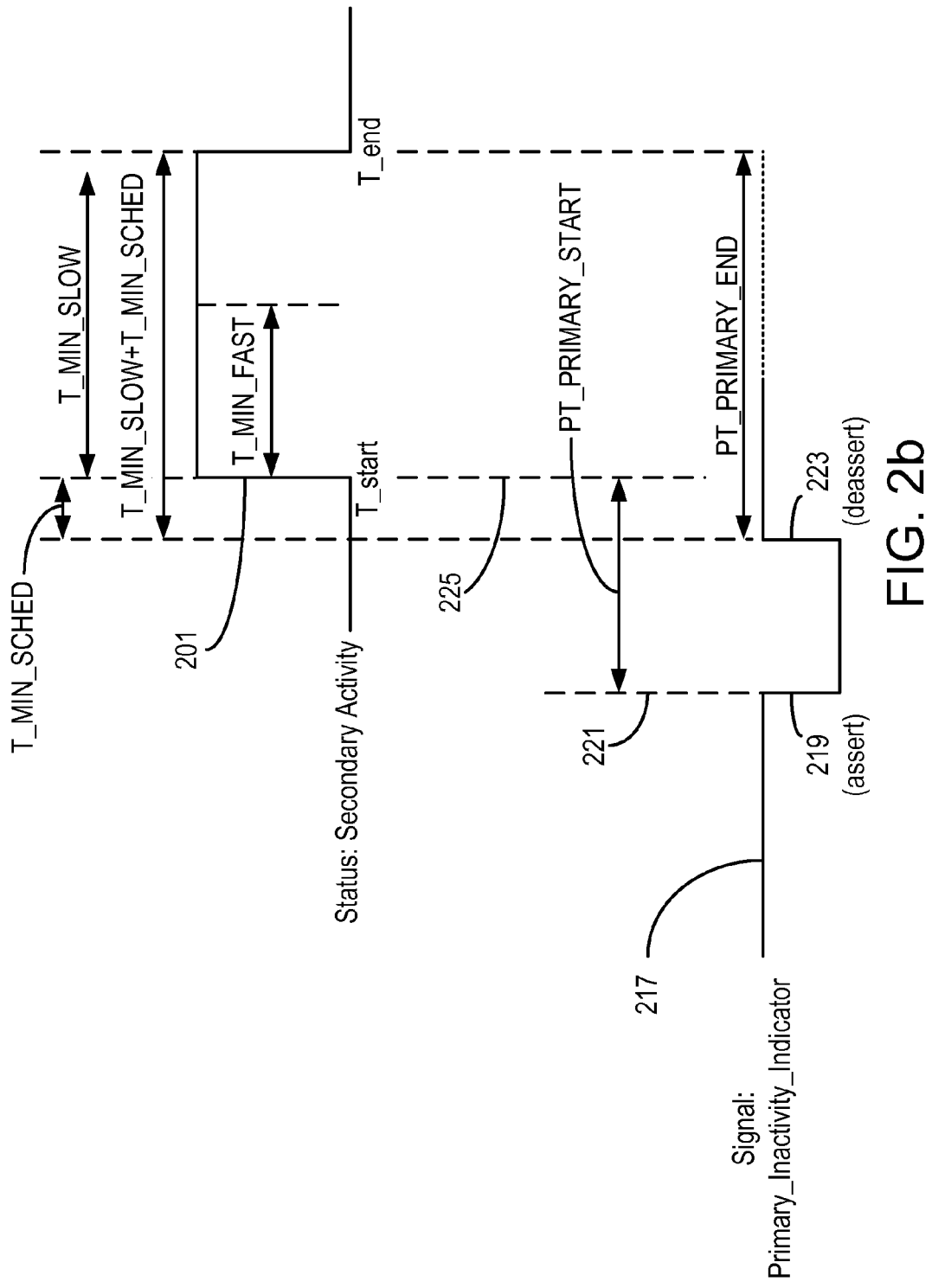

FIGS. 2a, 2b, and 2c are timing diagrams that illustrate how these conditions, when imposed on assertion and deassertion of the Primary_Inactivity_Indicator signal, operate to inform the secondary apparatus about a minimum duration of upcoming primary apparatus inactivity. It will be observed that in these as well as in all other examples presented herein, the Primary_Inactivity_Indicator signal is illustrated in the form of a signal whose assertion is negative-going, and whose deassertion is positive-going. Those of ordinary skill in the art will recognize that equivalent embodiments can be derived in which the polarity of the Primary_Inactivity_Indicator is reversed, so that assertions would be positive-going, and deassertions would be negative-going.

Looking first at FIG. 2a, this illustrates an instance in which the primary apparatus informs the secondary apparatus of an upcoming opportunity to perform an activity so long as that activity lasts no longer than T_MIN_FAST. To see how this operates, consider a worst case activity that can be performed by the secondary apparatus. This activity is illustrated by a graph of the secondary apparatus activity status ("Secondary Activity") 201 showing activity that begins at a time denoted "T_start", and that ends at a time denoted "T_end". As shown in the figure, the duration of this activity is T_MIN_SLOW. (It follows from this that Tend−T_start=T_MIN_SLOW.

It will first be observed that if it were desired to inform the secondary apparatus that it had only enough time to perform one worst case activity, that information should be provided in advance of the activity termination time by an amount equal to the duration of the worst case activity (T_MIN_SLOW) plus the time required for the secondary apparatus to schedule that activity (T_MIN_SCHED). That hypothetical moment is illustrated by dashed line 203, and this pre-notice duration is illustrated in several places as PT_PRIMARY_END in conformance with condition "1" set forth above.

Now suppose that the secondary apparatus's best case activity only requires a duration of T_MIN_FAST as illustrated in FIG. 2a. If this best case activity is to start at time T_start, it follows that it will and at the moment marked by dashed line 205. This means that, in accordance with condition "1", that the secondary apparatus must be informed of this activity termination time no later than the time denoted $t_{spike}$, which occurs in advance of the moment 205 by an amount PT_PRIMARY_END.

Since it is not permissible to inform the secondary apparatus about the activity opportunity's stop time before informing it about the activity opportunity's start time, it can be seen that the latest time that the secondary apparatus must be informed of the activity start time is also at the moment denoted $t_{spike}$. This is illustrated by the Primary_Inactivity_Indicator signal 207 being asserted 209 and then deasserted 211 substantially at the same moment, where assertion indicates upcoming inactivity, and deassertion indicates upcoming activity. (Those skilled in the art will recognize that, in practice, this signal "spike" will actually occur over some duration of time, however brief its duration is.)

The pre-notice time for informing the secondary apparatus about the upcoming opportunity start an activity is the duration PT_PRIMARY_START, as shown in the figure. The relationship between PT_PRIMARY_START and PT_PRIMARY_END can also be seen in FIG. 2a. In particular, if one works backwards from T_start, a time that is PT_PRIMARY_END in advance of T_start is marked by the dashed line 213. If one subtracts from this advance notice an amount of time corresponding to T_MIN_FAST, one arrives at a moment marked by dashed line 215, which coincides exactly with the moment $t_{spike}$.

In operation, if the Primary_Inactivity_Indicator signal is asserted 209 at time $t_{spike}$, then the secondary apparatus, knowing that condition 2 will be adhered to, can calculate that an opportunity to begin an activity will commence at a time equal to $t_{spike}$+PT_PRIMARY_START=T_start.

Assertion of the Primary_Inactivity_Indicator signal is not sufficient to inform the secondary apparatus about how long the activity opportunity will last. However, in this case the substantially immediate deassertion 211 of the Primary_Inactivity_Indicator at time $t_{spike}$ informs the secondary apparatus that its activity must cease no later than a moment equal to $t_{spike}$+PT_PRIMARY_END, which can be seen to occur at the moment denoted by dashed line 205. Thus, by adhering to conditions 1 and 2, the secondary apparatus can know from the primary apparatus' signaling that it can schedule, at most, one best case activity to begin at T_start.

FIG. 2b is a signal/timing diagram illustrating an instance in which the primary apparatus' signaling informs the secondary apparatus that it will have an opportunity to schedule activities whose combined durations cannot exceed that of one worst case activity. As in FIG. 2a, a graph of the secondary apparatus activity status 201 is depicted showing activity that begins at a time denoted "T_start", and that ends at a time denoted "T_end". As shown in the figure, the duration of this activity is T_MIN_SLOW.

The primary apparatus uses the Primary_Inactivity_Indicator signal 217 to inform the secondary apparatus about an upcoming period of inactivity (and hence also an upcoming opportunity for the secondary apparatus to perform at least one activity) by asserting 219 the Primary_Inactivity_Indicator signal 217 at a moment marked by dashed line 221, and by subsequently deasserting 223 the signal at a moment marked by dashed line 225. It will be observed that both assertion 219 and deassertion 223 of the signal occur prior to the time T_start at which the primary apparatus' period of activity will commence.

Because the Primary_Inactivity_Indicator signal 217 conforms with conditions 1 and 2, the secondary apparatus is able to ascertain that the primary apparatus' period of inactivity will commence at a moment that is PT_PRIMARY_START later than the moment marked by dashed line 221, which corresponds to time T_start. The secondary apparatus is also able to ascertain from this signaling that the primary apparatus' period of activity will resume at a moment that is PT_PRIMARY_END later than the moment marked by dashed line 225, which corresponds to time T_end. By subtracting T_start from T_end, the secondary apparatus is able to ascertain that the primary apparatus' period of inactivity will last an amount of time equal to T_MIN_SLOW. Consequently, the secondary apparatus can schedule no more than a single worst case activity, or alternatively up to as many shorter-duration activities as will fit within the allotted amount of time.

FIG. 2c is another signal/timing diagram, this one illustrating an instance in which the primary apparatus' signaling informs the secondary apparatus that it will have an opportunity to schedule activities whose combined durations can at least be as long as one worst case activity, and possibly longer. As in FIGS. 2a and 2b, a graph of the secondary apparatus activity status 227 is depicted showing activity that begins at a time denoted "T_start", and that ends at a time denoted "T_end". This examples differs from the ones shown in FIGS. 2a and 2b in that the duration of the secondary apparatus' activity exceeds T_MIN_SLOW by some non-zero amount.

The primary apparatus uses the Primary_Inactivity_Indicator signal 229 to inform the secondary apparatus about an upcoming period of inactivity (and hence also an upcoming opportunity for the secondary apparatus to perform at least one activity) by asserting 231 the Primary_Inactivity_Indicator signal 229 at a moment marked by dashed line 233, and by subsequently deasserting 235 the signal at a moment marked by dashed line 237. It will be observed that although assertion 231 must, by definition, take place prior to the start time, T_start, of the upcoming period of primary apparatus inactivity, the deassertion 235 does not take place until sometime after the secondary apparatus' activity opportunity has commenced.

Because the Primary_Inactivity_Indicator signal 217 conforms with conditions 1 and 2, the secondary apparatus is able to ascertain that the primary apparatus' period of inactivity will commence at a moment that is PT_PRIMARY_START later than the moment marked by dashed line 233, which corresponds to time T_start. Because no deassertion of the Primary_Inactivity_Indicator signal 229 has occurred by the time the secondary apparatus is ready to begin scheduling its activities (this time being T_MIN_SCHED in advance of T_start, as marked by dashed line 239), the secondary apparatus begins scheduling activities as needed, and continues to do so while monitoring the Primary_Inactivity_Indicator signal 229.

When the secondary apparatus detects the deassertion 235 of the Primary_Inactivity_Indicator signal 229, it is able to ascertain that the primary apparatus' period of activity will resume at a moment that is PT_PRIMARY_END later than the moment marked by dashed line 237, which corresponds to time T_end. Because the Primary_Inactivity_Indicator signal 229 conforms with conditions 1 and 2, it knows that the primary apparatus' remaining period of inactivity will last an amount of time equal to T_MIN_SLOW plus the time required for the secondary apparatus to schedule activity. Consequently, the secondary apparatus can schedule no more than a single worst case activity, or alternatively up to as many shorter-duration activities as will fit within the allotted amount of time.

Figure 3:
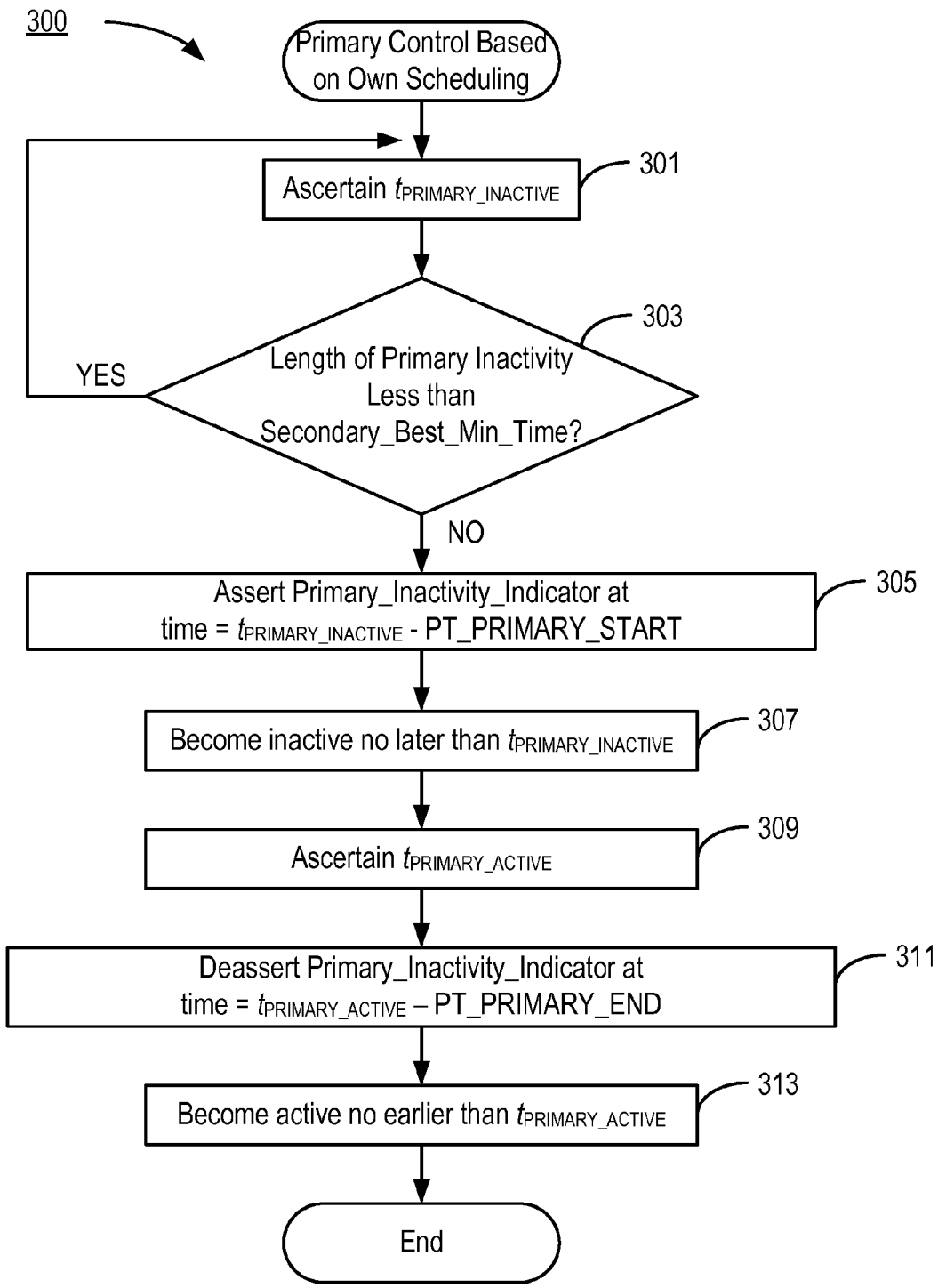
FIG. 3 is, in one respect, a flow diagram of steps/processes performed by a primary apparatus in accordance with aspects of some exemplary embodiments of the invention.

To further illustrate aspects of embodiments consistent with exemplary embodiments of the invention, FIG. 3 is, in one respect, a flow chart of steps/processes performed by a primary apparatus in accordance with some but not necessarily all exemplary embodiments of the invention. In another respect, FIG. 3 can be considered to depict exemplary means 300 comprising the various illustrated circuitry (e.g., hardwired and/or suitably programmed processor) configured to perform the described functions.

In this exemplary embodiment, the primary apparatus determines that it will, starting at a future moment, be idle for a long enough period of time to justify its signaling to the secondary apparatus that the secondary apparatus may perform an activity. The illustrated embodiment begins when the primary apparatus ascertains a future moment in time, $t_{PRIMARY\_INACTIVE}$, when it will become inactive (step 301). The primary apparatus next ascertains whether the expected length of inactivity is less than the secondary apparatus' best case minimum amount of time required to perform an activity ("Secondary_Best_Min_Time") (decision block 303).

If the expected length of primary apparatus inactivity will be less than Secondary_Best_Min_Time, then the secondary apparatus will not be able to use the primary apparatus' period of inactivity. Consequently ("YES" path out of decision block 303), control processing reverts back to step 301.

If the expected length of primary apparatus inactivity will not be less than Secondary_Best_Min_Time ("NO" path out of decision block 303), then the primary apparatus will signal an upcoming opportunity to perform at least one activity. Accordingly, the primary apparatus asserts the Primary_Inactivity_Indicator at a time that is PT_PRIMARY_START in advance of the time $t_{PRIMARY\_INACTIVE}$ at which it will become inactive (i.e., at a time=$t_{PRIMARY\_INACTIVE}$–PT_PRIMARY_START) (step 305). Then, the primary apparatus schedules its own activity so as to ensure that it becomes inactive no later than the time $t_{PRIMARY\_INACTIVE}$ (step 307).

Also as part of this control function, and not necessarily after step 307 as shown in FIG. 3, the primary apparatus ascertains a future moment in time, $t_{PRIMARY\_ACTIVE}$, when it will again become active (step 309). The primary apparatus then needs to signal the upcoming end of its period of inactivity to the secondary apparatus. Accordingly, the primary apparatus deasserts the Primary_Inactivity_Indicator at a time that is PT_PRIMARY_END in advance of the time $t_{PRIMARY\_ACTIVE}$ at which it will become active (i.e., at a time=$t_{PRIMARY\_ACTIVE}$–PT_PRIMARY_END) (step 311). Then, the primary apparatus schedules its own activity so as to ensure that it becomes active no earlier than the time $t_{PRIMARY\_ACTIVE}$.

It will be appreciated from a comparison of FIGS. 2a, 2b, and 2c that in some instances the primary apparatus knows prior to its asserting the Primary_Inactivity_Indicator signal, exactly when it will again become active (see, e.g., FIGS. 2a and 2b), and in other instances this knowledge is not available to the primary apparatus until sometime after the Primary_Inactivity_Indicator signal is asserted (see, e.g., FIG. 2c). This means that in some instances, steps such as illustrated steps 309 and 311 are performed prior to the time $t_{PRIMARY\_INACTIVE}$, and in other instances afterwards. Those of ordinary skill in the art will readily understand how to modify the embodiment of FIG. 3 in a manner that tests for when the time $t_{PRIMARY\_ACTIVE}$ is known, and accordingly performing steps 311 and 313 at suitable moments.

The focus has so far been on the primary apparatus' knowledge about its upcoming inactivity, and the use of this knowledge to perform advance signaling to the secondary apparatus indicating the start and stop times of this upcoming inactivity. However, the secondary apparatus need not operate solely at the mercy of the primary apparatus. In another aspect of some but not necessarily all embodiments, advantage is taken of the fact that, in many typical scenarios, the secondary apparatus knows (and defines) when highly important activity will occur. This information regarding upcoming highly important activity is accordingly output by the secondary apparatus on the Secondary_Activity_Request signal illustrated in FIG. 1. The primary apparatus uses the signaled information to decide whether to grant the secondary apparatus' request, and if so, to schedule its own activities so as to become inactive no later than at the requested moment, and to resume activity no earlier than a moment that ensures that the secondary apparatus will have enough time to perform its important activity. This means that assertion and deassertion of the Secondary_Activity_Request signal each occur in advance of their respective actual important activity start and end times. The pre-notice time that will govern this signaling can be a fixed value, known to each of the primary and secondary apparatuses (e.g., pre-configured in a configuration file or hard coded in the firmware/hardware). Alternatively, the pre-notice time can be negotiated between the primary and secondary apparatuses. Any existing real-time interface or software interface (not related to aspects described herein) can be used. Another possibility for negotiation is to utilize one or both of the signaling lines respectively denoted Primary_Inactivity_Indicator and Secondary_Activity_Request in FIG. 1. During device start-up, pre-notice time information can be communicated over these lines by means of a signaling protocol, such as but not limited to UART, I2C, and the like. After negotiation of the pre-notice time information is complete, these signals take on their "normal" (i.e., run-time) meanings as described herein.

If it is found to be advantageous in some embodiments, the pre-notice time for signaling the start ("PT_SECONDARY_START") of the upcoming highly important activity can be different from the pre-notice time for signaling the end ("PT_SECONDARY_END") of the upcoming highly important activity.

When the secondary apparatus is scheduled to perform a highly important activity (e.g., in communication system embodiments, to send/receive highly important traffic), the secondary apparatus asserts the Secondary_Activity_Request signal in advance of the start time of that activity by an amount equal to PT_SECONDARY_START. This action triggers the primary apparatus to, at its discretion, start scheduling its own time of inactivity to begin after an amount of time equaling PT_SECONDARY_START.

Similarly, when the secondary apparatus is scheduled to end its highly important activity (e.g., in communication system embodiments, to finish sending/receiving highly important traffic), the secondary apparatus deasserts the Secondary_Activity_Request signal in advance of the end time of that activity by an amount equal to PT_SECONDARY_END. This action triggers the primary apparatus to, at its discretion, start scheduling its own activity to begin after an amount of time equaling PT_SECONDARY_END.

When considering what values to establish for the prenotice times PT_SECONDARY_START and PT_SECONDARY_END, one should be aware that the primary apparatus needs time to prepare its scheduling, so PT_SECONDARY_START and PT_SECONDARY_END should be made sufficiently large so as to satisfy:

$$PT\_SECONDARY\_END \geq T\_PRIMARY\_MIN\_SCHEDULING \quad 3.$$

$$PT\_SECONDARY\_START \geq T\_PRIMARY\_MIN\_SCHEDULING \quad 4.$$

where T_PRIMARY_MIN_SCHEDULING is the primary apparatus' minimum amount of time required for it to schedule inactivity/activity.

It will be appreciated that conditions "3" and "4" as set forth above are exemplary embodiments, and that refinements and/or improvements can be made (e.g., in instances in which the primary apparatus' time required to schedule activity differs from its time required to schedule inactivity.

Figure 4:
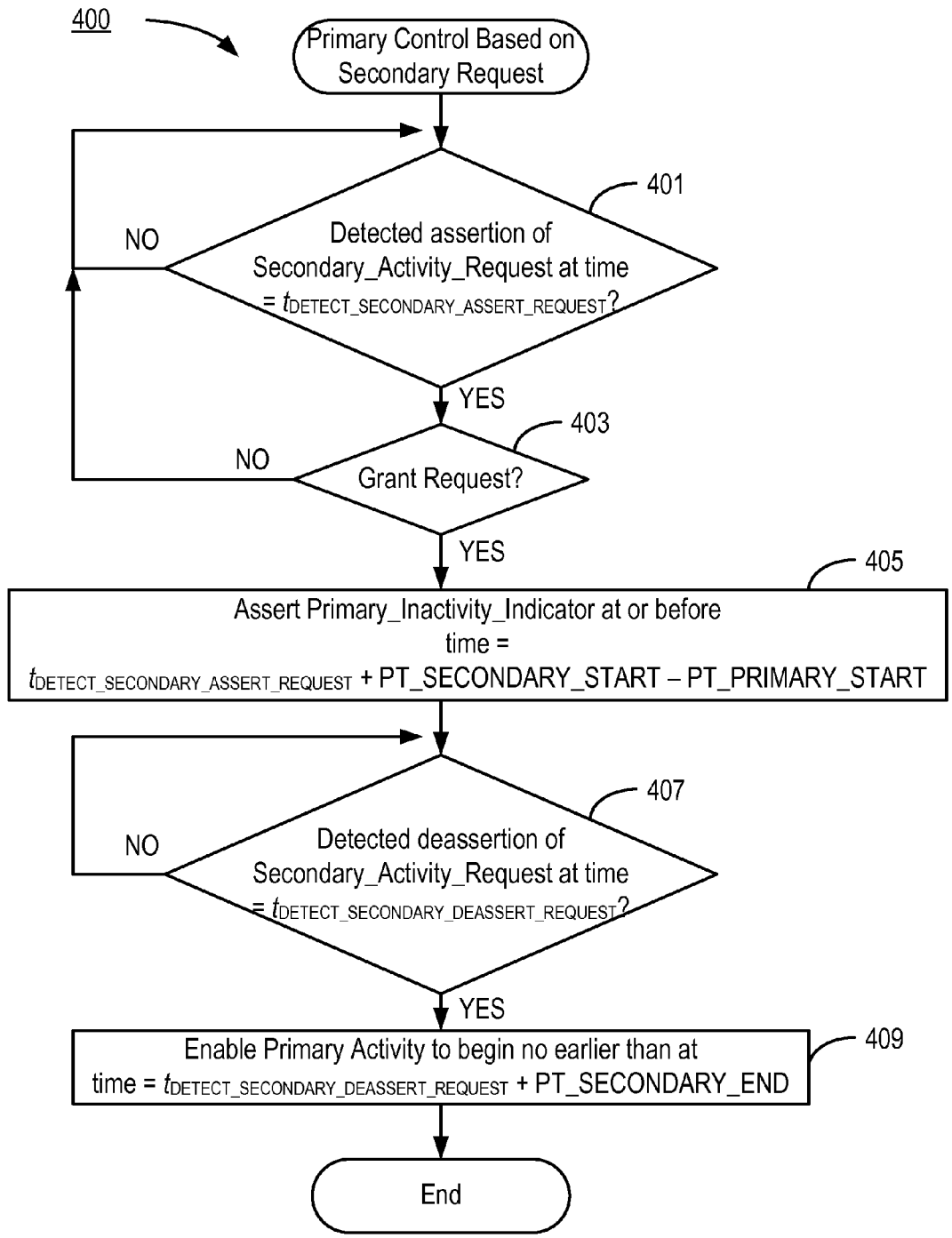
FIG. 4 is, in one respect, a flow diagram of steps/processes performed by a primary apparatus in accordance with other aspects of some exemplary embodiments of the invention.

To further illustrate aspects of embodiments consistent with exemplary embodiments of the invention, FIG. 4 is, in one respect, a flow chart of steps/processes performed by a primary apparatus in accordance with some but not necessarily all exemplary embodiments of the invention. In another respect, FIG. 4 can be considered to depict exemplary means 400 comprising the various illustrated circuitry (e.g., hardwired and/or suitably programmed processor) configured to perform the described functions.

This exemplary embodiment illustrates the primary apparatus' operations in response to detecting that the secondary apparatus has made an activity request by asserting the Secondary_Activity_Request signal. Illustrated processing begins with the primary apparatus detecting whether, at a time herein denoted $t_{DETECT\_SECONDARY\_ASSERT\_REQUEST}$, the Secondary_Activity_Request signal has been asserted (decision block 401). If assertion has not been detected ("NO" path out of decision block 401), processing reverts back to performing this test again.

Once assertion of the Secondary_Activity_Request signal has been detected ("YES" path out of decision block 401), the primary apparatus decides whether to grant the request (decision block 403). How to make this decision is quite application dependent, and is beyond the scope of the invention. It is sufficient to note that a person of ordinary skill in the art, designing such a system, would readily understand what factors to consider under the circumstances, and would be able to come up with a suitable decision-making process.

If the secondary apparatus' request is not to be granted ("NO" path out of decision block 403), then it is ignored and processing simply reverts back to decision block 401 so that the primary apparatus can monitor the Secondary_Activity_Request signal to detect a subsequent assertion of this signal.

If the secondary apparatus' request is to be granted ("YES" path out of decision block 403), then the primary apparatus asserts its own Primary_Inactivity_Indicator signal at or before a time=$t_{DETECT\_SECONDARY\_ASSERT\_REQUEST}$+PT_SECONDARY_START−PT_PRIMARY_START (step 405). It will be recognized that the primary apparatus will become inactive at or before time=$t_{DETECT\_SECONDARY\_ASSERT\_REQUEST}$+PT_SECONDARY_START. Hence, its Primary_Inactivity_Indicator signal is asserted by an amount equal to PT_PRIMARY_START in advance of that time, in accordance with principles explained earlier.

The primary apparatus also monitors the Secondary_Activity_Request signal for deassertion (decision block 407) and when such deassertion is detected the time, $t_{DETECT\_SECONDARY\_DEASSERT\_REQUEST}$ is noted. So long as deassertion is not detected ("NO" path out of decision block 407), the primary apparatus continues this monitoring activity.

Once deassertion of the Secondary_Activity_Request signal is detected, this occurring at a time that is herein denoted $t_{DETECT\_SECONDARY\_DEASSERT\_REQUEST}$ ("YES" path out of decision block 407), the primary apparatus schedules its own activities to resume no earlier than at a time= $t_{DETECT\_SECONDARY\_ASSERT\_REQUEST}$+PT_SECONDARY_START (step 409). Still in accordance with principles described earlier, the primary apparatus signals this planned resumption of activity by de-asserting the Primary_Inactivity_Indicator signal by an amount equal to PT_PRIMARY_END in advance of this planned activity resumption time.

Figure 5:
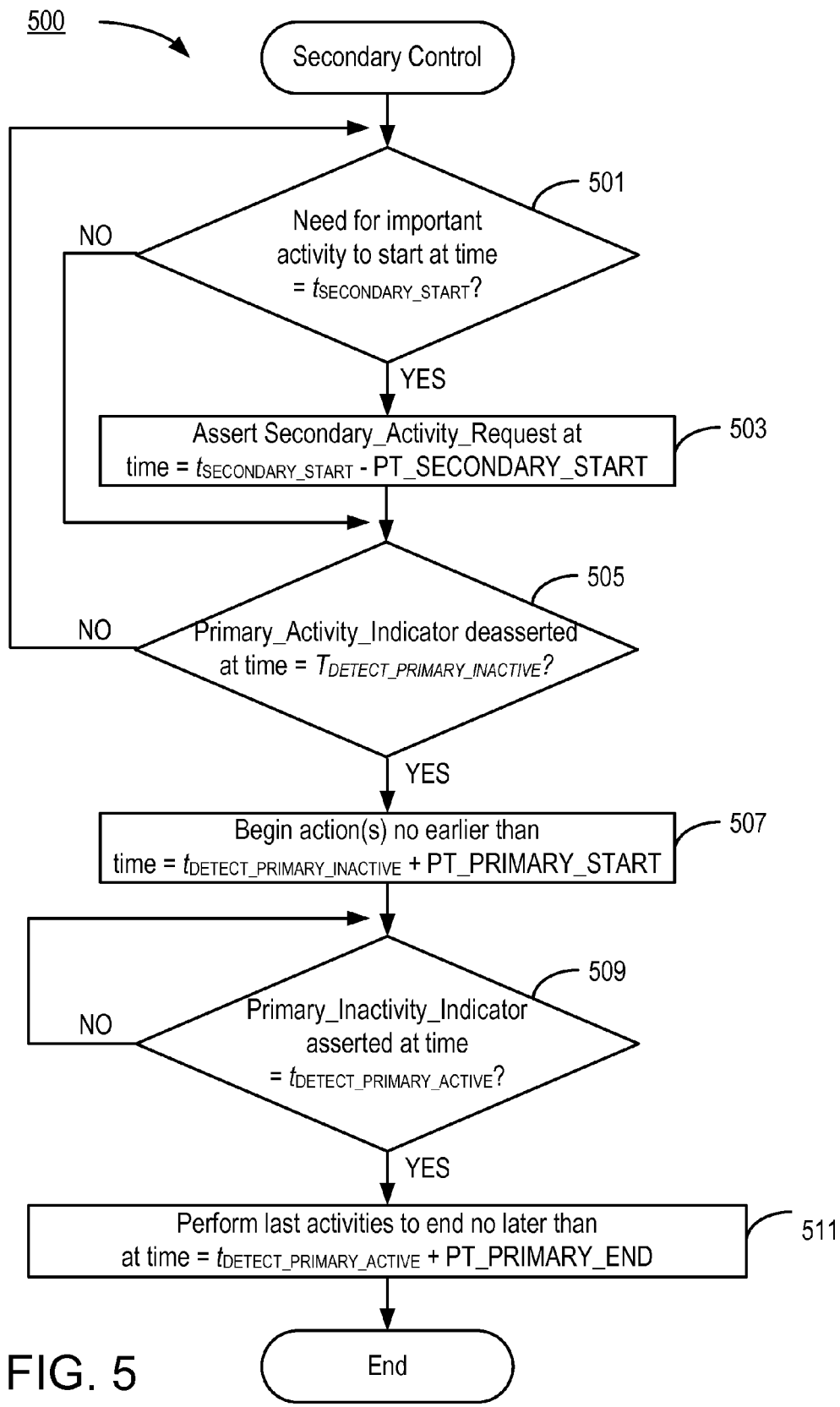
FIG. 5 is, in one respect, a flow diagram of steps/processes performed by a secondary apparatus in accordance with aspects of some exemplary embodiments of the invention.

To further illustrate aspects of embodiments consistent with exemplary embodiments of the invention, FIG. 5 is, in one respect, a flow chart of steps/processes performed by a secondary apparatus in accordance with some but not necessarily all exemplary embodiments of the invention. In another respect, FIG. 5 can be considered to depict exemplary means 500 comprising the various illustrated circuitry (e.g., hardwired and/or suitably programmed processor) configured to perform the described functions.

This exemplary embodiment illustrates processing that is performed by the secondary apparatus. Illustrated processing begins with the primary apparatus ascertaining whether it has a need for important activity to start at a future moment in time, herein denoted $t_{SECONDARY\_START}$ (decision block 501). It will be understood that what constitutes an "important" activity can vary from one embodiment to the next, and can even encompasses embodiments in which any activity whatsoever is considered "important". In other embodiments, a filtering operation is performed so that some ("important") but not other activities satisfy the tested predicate. Again, this filtering is application specific, and is beyond the scope of the invention. In the simple case, all activities are considered important and the testing represented by decision block 501 reduces to merely testing whether there is any desire to begin an activity at the future moment, $t_{SECONDARY\_START}$.

If a need for important activity to start at time $t_{SECONDARY\_START}$ is detected ("YES" path out of decision block 501), then the secondary apparatus asserts the Secondary_Request signal in advance of $t_{SECONDARY\_START}$ by a pre-notice time equal to PT_SECONDARY_START (i.e., the Secondary_Request signal is asserted at time= $t_{SECONDARY\_START}$−PT_SECONDARY_START) (step 503).

Following this step, or directly after decision block 501 if no need for important activity to start was detected ("NO" path out of decision block 501), the secondary apparatus ascertains whether, at a present time herein denoted $T_{DETECT\_PRIMARY\_INACTIVE}$, the primary apparatus' Primary_Inactivity_Indicator signal has been asserted (decision block 505). Any assertion can be in response to the secondary apparatus' request, if one was made (i.e., performance of step 503), or may alternatively be a result of the primary apparatus' independent decision to schedule a period of inactivity (e.g., in instances in which the primary apparatus has run out of activities to perform for at least the time being).

If the Primary_Inactivity_Indicator signal has not been asserted (meaning that the primary apparatus has not signaled that it plans to become inactive at a future moment in time), then the secondary apparatus' processing reverts back to decision block 501 and operates as described above with updated values of $t_{SECONARY\_START}$ and $T_{DETECT\_PRIMARY\_INACTIVE}$ ("NO" path out of decision block 505).

However, if the secondary apparatus detects that, at a present time $T_{DETECT\_PRIMARY\_INACTIVE}$, the Primary_Inactivity_Indicator signal has been asserted (meaning that the primary apparatus has signaled that it plans to become inactive at a future moment in time), then ("YES" path out of decision block 505) the secondary apparatus schedules one or more activities to begin no earlier than at a future moment occurring at time=$t_{DETECT\_PRIMARY\_INACTIVE}$+PT_PRIMARY_START (step 507). As explained in detail earlier, this is in accordance with the primary and secondary apparatuses operating in accordance with condition "2".

Also as part of this control function, and not necessarily after step 507 as shown in FIG. 5, the secondary apparatus monitors the Primary_Inactivity_Indicator signal to ascertain whether, at a present moment herein denoted $t_{DETECT\_PRIMARY\_ACTIVE}$, the primary apparatus has signaled that it intends to become active at a future moment in time (decision block 509). If deassertion of the Primary_Inactivity_Indicator signal is not detected ("NO" path out of decision block 507), then this monitoring activity is repeated.

However, if the secondary apparatus detects deassertion of the Primary_Inactivity_Indicator signal ("YES" path out of decision block 509), then the secondary apparatus knows that the primary apparatus will resume activity at a future moment in time=$t_{DETECT\_PRIMARY\_ACTIVE}$+PT_PRIMARY_END, this being in accordance with condition 1. Therefore, the secondary apparatus schedules performance one or more final activities (assuming that there are activities remaining to perform), with the last scheduled activity ending no later than time=$t_{DETECT\_PRIMARY\_ACTIVE}$+PT_PRIMARY_END, and with the total duration of these final activities lasting no more than the duration of one worst case activity (i.e., T_MIN_SLOW) (step 511).

It will be appreciated from a comparison of FIGS. 2a, 2b, and 2c that in some instances the secondary apparatus detects deassertion of the Primary_Inactivity_Indicator signal prior to time=$t_{DETECT\_PRIMARY\_INACTIVE}$+PT_PRIMARY START (see, e.g., FIGS. 2a and 2b), in which case the secondary apparatus can determine, from conditions 1 and 2 and prior to the start of any of its activities, exactly how much time will be allotted for its activities. In other instances, the secondary apparatus detects assertion of the Primary_Inactivity_Indicator signal prior to time=$t_{DETECT\_PRIMARY\_INACTIVE}$+PT_PRIMARY_START, but does not detect deassertion of that signal until after time=$t_{DETECT\_PRIMARY\_INACTIVE}$+PT_PRIMARY_START (see, e.g., FIG. 2c). In such instances, the secondary apparatus knows that it can schedule at least an amount of activity lasting no more than T_MIN_SLOW, and that it can continue scheduling activities indefinitely until deassertion of the Primary_Inactivity_Indicator signal is detected, at which point scheduling is performed in accordance with step 511 described above.

What this means is that in some instances, steps such as illustrated steps 509 and 511 are performed prior to the time=$t_{DETECT\_PRIMARY\_INACTIVE}$+PT_PRIMARY_START, and in other instances they are performed afterwards. Those of ordinary skill in the art will readily understand how to modify the embodiment of FIG. 5 in a manner that tests for when the time=$t_{DETECT\_PRIMARY\_INACTIVE}$+PT_PRIMARY_START is known, and performing steps 509 and 511 at suitable moments.

Figure 6:
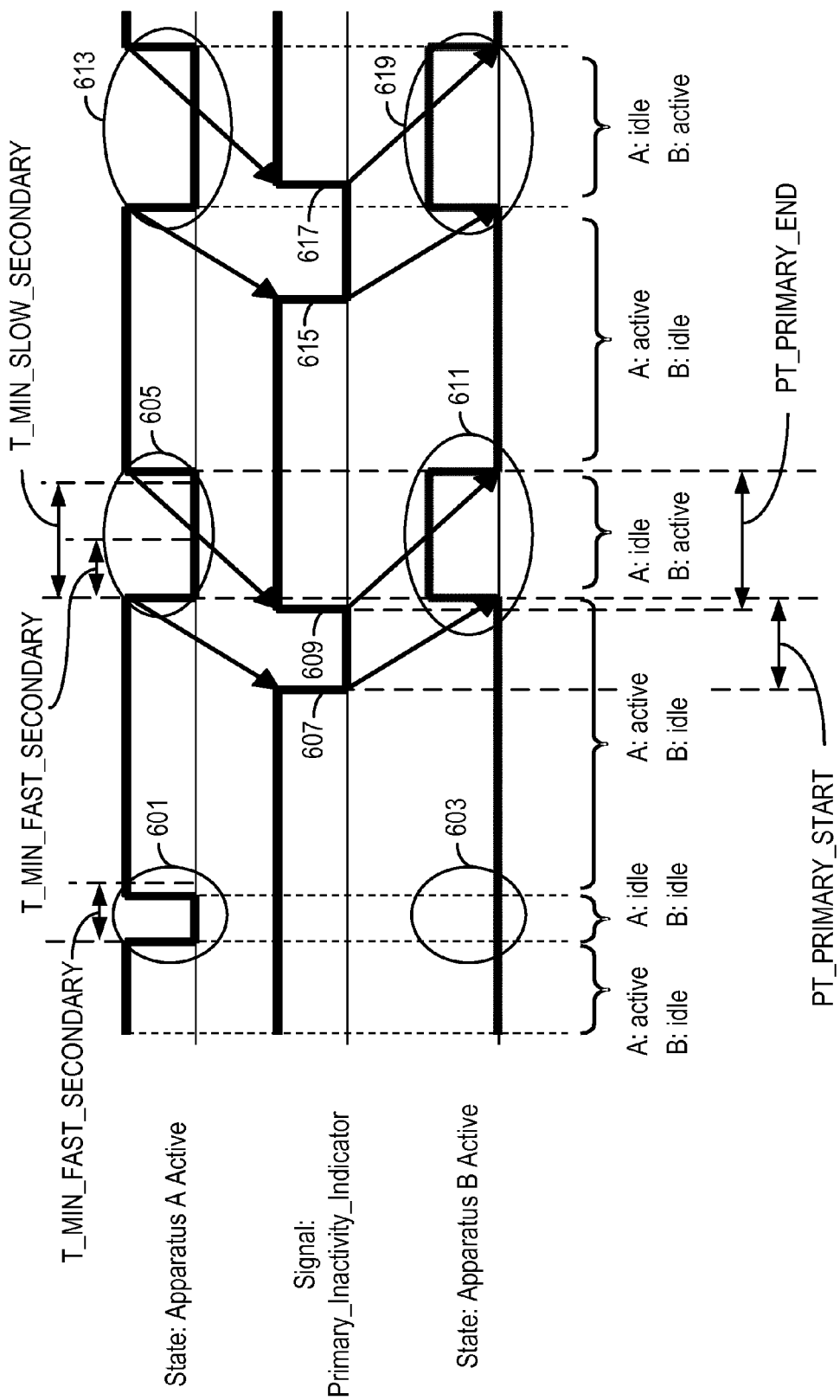
FIG. 6 is a signal/timing diagram illustrating some aspects of embodiments consistent with the invention in which a primary apparatus efficiently enables a secondary apparatus to perform activity without either of the apparatuses interfering with the other.

This description will now present a number of examples of signaling between a primary and secondary apparatus that further illustrates various aspects of embodiments consistent with the invention. FIG. 6 is a signal/timing diagram that shows the relationship between, on the one hand, a primary apparatus ("Apparatus A") asserting and deasserting the Primary_Inactivity_Indicator signal and, on the other, a secondary apparatus' ("Apparatus B") use of the signaling to schedule its own activities.

The top line illustrates a time-wise status of the Apparatus A with respect to whether Apparatus A is active or inactive at any moment, with periods of activity being represented by the Apparatus A status at a high level and periods of inactivity being represented by a low state.

The middle line in the figure illustrates the Primary_Inactivity_Indicator signal, which was discussed above. This signal, when deasserted (in this example, at a high logic level), indicates at any given moment that the Apparatus A status will be "active" at a determinable future moment. Similarly, the Primary_Inactivity_Indicator signal, when asserted (in this example, at a low logic level), indicates at any given moment that the Apparatus A status will be "inactive" at a determinable future moment. Accordingly, the moments of transition (e.g., from deasserted to asserted and from asserted to deasserted) are useful for signaling when the Apparatus A's status will change.

The lowest line in the figure illustrates a time-wise status of the Apparatus B with respect to whether Apparatus B is active or inactive at any moment, with periods of activity being represented by the Apparatus B status at a high level and periods of inactivity being represented by a low state.

Several aspects are illustrated in FIG. 6. In one of these, it can be seen from the Apparatus A Active status that there is a period 601 during which the Apparatus A is, in fact, inactive. However, the duration of this inactivity is less than the secondary apparatus' best case minimum activity time (T_MIN_FAST_SECONDARY), meaning that the secondary apparatus would be unable to use this time to perform any activity. Accordingly, the Apparatus A does not assert the Primary_Inactivity_Indicator signal in advance of the period 601, and the Apparatus B consequently remains inactive 603 during this time.

FIG. 6 further illustrates an instance in which the Apparatus A will be inactive for a period of time 605 that exceeds the Apparatus B's worst case activity time (T_MIN_SLOW_SECONDARY). Since the Apparatus B is capable of using this time to perform one or more activities, the Primary_Inactivity_Indicator signal is asserted and subsequently deasserted in advance of the period 605 to signal to the Apparatus B that the Apparatus A will be inactive during the period 605. The assertion 607 occurs in advance of the start of the period 605 by an amount equal to PT_PRIMARY_START, and the deassertion 609 occurs in advance of the end of the period 605 by an amount equal to PT_PRIMARY_END.

These prenotice times, PT_PRIMARY_START and PT_PRIMARY_END, comply with conditions 1 and 2 set forth earlier, and the Apparatus B knows what their values are. Consequently, detecting the moments of assertion 607 and deassertion 609 of the Primary_Inactivity_Indicator enables the Secondary Apparatus B to ascertain the start and end moments of the period 605. Accordingly, the Apparatus B schedules one or more activities to be performed during this time, and this is reflected by the Apparatus B Active status being asserted (active) during the time 611.

A similar period 613 of Apparatus A inactivity is shown occurring at a later time. Since this period will last at least as long as the Apparatus B's best case minimum amount of time required to perform an activity, the upcoming start and end times of the period 613 are signaled to the Apparatus B via assertion 615 and subsequent deassertion 617 of the Primary_Inactivity_Indicator signal in advance of these respective start and end times. It will be observed that, in this instance, deassertion 617 of the Primary_Inactivity_Indicator signal occurs after the beginning of the period 613, so that the Apparatus B does not know when the period 613 will end until sometime after it has started performing one or more activities.

The Apparatus B uses the moments of detection of assertion 615 and deassertion 617 of the Primary_Inactivity_Indicator signal in conjunction with the knowledge about the prenotice times PT_PRIMARY_START and PT_PRIMARY_END to control the scheduling of its own period of activity 619 which, as can be seen, is coincident with the period 613.

Figure 7:
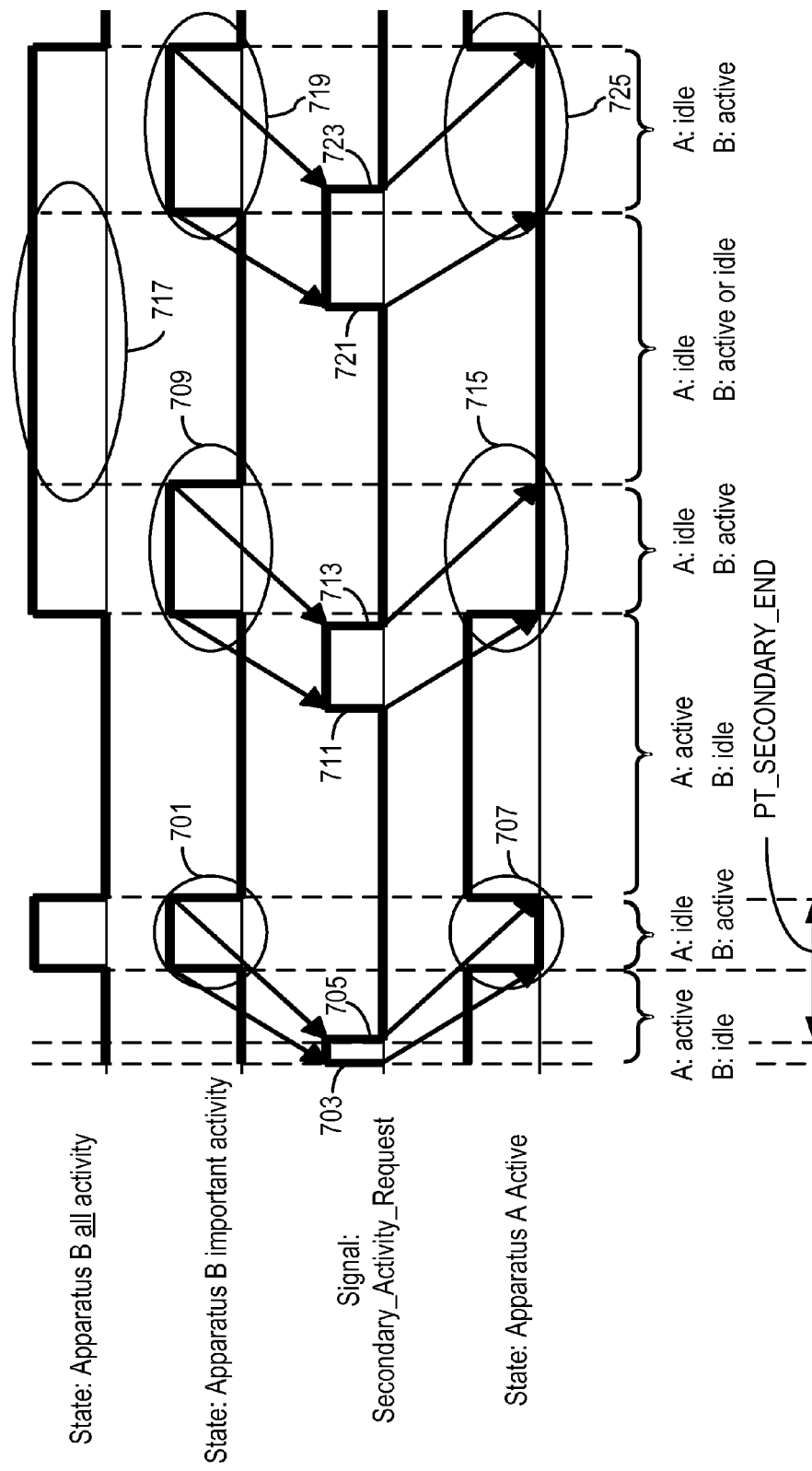
FIG. 7 is a signal/timing diagram illustrating some aspects of embodiments consistent with the invention in which a secondary apparatus is able to inform a primary apparatus of a need to perform activity, and thereby to be granted an opportunity to perform the activity without there arising any interference between the primary and secondary apparatuses.

FIG. 7 is another signal/timing diagram that shows the relationship between, on the one hand, a secondary apparatus ("Apparatus B") requesting time to perform one or more important activities, and a primary apparatus ("Apparatus A") granting those requests.

The top line illustrates a time-wise status of the Apparatus B with respect to whether Apparatus B is active or inactive at any moment regardless of whether that activity is important or not, with periods of activity being represented by the Apparatus B all activity status being at a high level and periods of inactivity being represented by a low state.

The second line down from the top illustrates a time-wise status of the Apparatus B with respect to whether Apparatus B is active or inactive at any moment with respect to only important activity, with periods of activity being represented by the Apparatus B important activity status being at a high logic level and periods of inactivity being represented by a low logic level.

The third line down from the top illustrates the Apparatus B's Secondary_Activity_Request signal, which was discussed above. This signal, when asserted at a high logic level, indicates at any given moment that the Apparatus B will have an important need to perform one or more important activities at a future moment. Similarly, the Secondary_Activity_Request Indicator signal, when deasserted at a low logic level, indicates at any given moment that the Apparatus B will not have a need to perform any important activities at a determinable future moment. Accordingly, the moments of transition (e.g., from asserted to deasserted and from deasserted to asserted) are useful for signaling the duration of the Apparatus B's need to perform important activities.

The bottom line in the figure illustrates a time-wise status of the Apparatus A with respect to whether Apparatus A is active or inactive at any moment, with periods of activity being represented by the Apparatus A status being at a high logic level and periods of inactivity being represented by a low logic level.

Several aspects are illustrated in FIG. 7. In one of these, the Apparatus B knows that it will have a need to perform important activity beginning at the start of period 701. Since the Apparatus B cannot schedule performance of this activity without the Apparatus A's agreement to remain inactive during this period of time, the Apparatus B asserts 703 its Secondary_Activity_Request signal in advance of the start of period 701 by an amount equal to PT_SECONDARY_START. In this example, the Apparatus B also knows for how long that important activity will last. Accordingly, the Apparatus B deasserts 705 the Secondary_Activity_Request signal in advance of the end of period 701 by an amount equal to PT_SECONDARY_END.

In this example, the Apparatus A decides to grant Apparatus B's request, and consequently schedules itself to remain inactive during a period 707 that coincides with the period 701 so that the Apparatus B can perform its important activity during the period 701. (The Apparatus A's assertion and subsequent deassertion of its Primary_Inactivity_Indicator signal are not shown in this example, but they operate as shown in other figures so that the Apparatus B knows not only that its request has been granted, but also how long the Apparatus A intends to remain inactive.)

FIG. 7 also shows another example, in which the Apparatus B knows that it will have a need to perform important activity beginning at the start of period 709. The Apparatus B accordingly asserts 711 its Secondary_Activity_Request signal in advance of the start of period 709 by an amount equal to PT_SECONDARY_START. In this example, the Apparatus B also knows for how long that important activity will last. Accordingly, the Apparatus B deasserts 713 the Secondary_Activity_Request signal in advance of the end of period 709 by an amount equal to PT_SECONDARY_END.

In this example, the Apparatus A decides to grant Apparatus B's request, and consequently schedules itself to remain inactive during a period 715 that coincides with the period 709 so that the Apparatus B can perform its important activity during the period 709. (The Apparatus A's assertion and subsequent deassertion of its Primary_Inactivity_Indicator signal are not shown in this example, but they operate as shown in other figures so that the Apparatus B knows not only that its request has been granted, but also how long the Apparatus A intends to remain inactive.) Of special interest in this example is the fact that the Apparatus A, for its own reasons, has decided to remain inactive for a period lasting longer than the period 709. Since the Apparatus B knows that the Apparatus A is remaining inactive by virtue of its not deasserting the Primary_Inactivity_Indicator signal (not shown), the Apparatus B takes advantage of this opportunity by scheduling other (non-important) activity to take place during the period 717 that immediately follows the period 709.

This example further illustrates yet another upcoming period 719 during which the Apparatus B needs to perform important activity. The Apparatus B accordingly asserts 721 its Secondary_Activity_Request signal in advance of the start of period 719 by an amount equal to PT_SECONDARY_START. In this example, the Apparatus B also knows for how long that important activity will last. Accordingly, the Apparatus B deasserts 723 the Secondary_Activity_Request signal in advance of the end of period 719 by an amount equal to PT_SECONDARY_END.

In this example, the Apparatus A decides to grant Apparatus B's request, and consequently schedules itself to remain inactive during a period 725 that coincides with the period 719 so that the Apparatus B can perform its important activity during the period 719.

Figure 8:
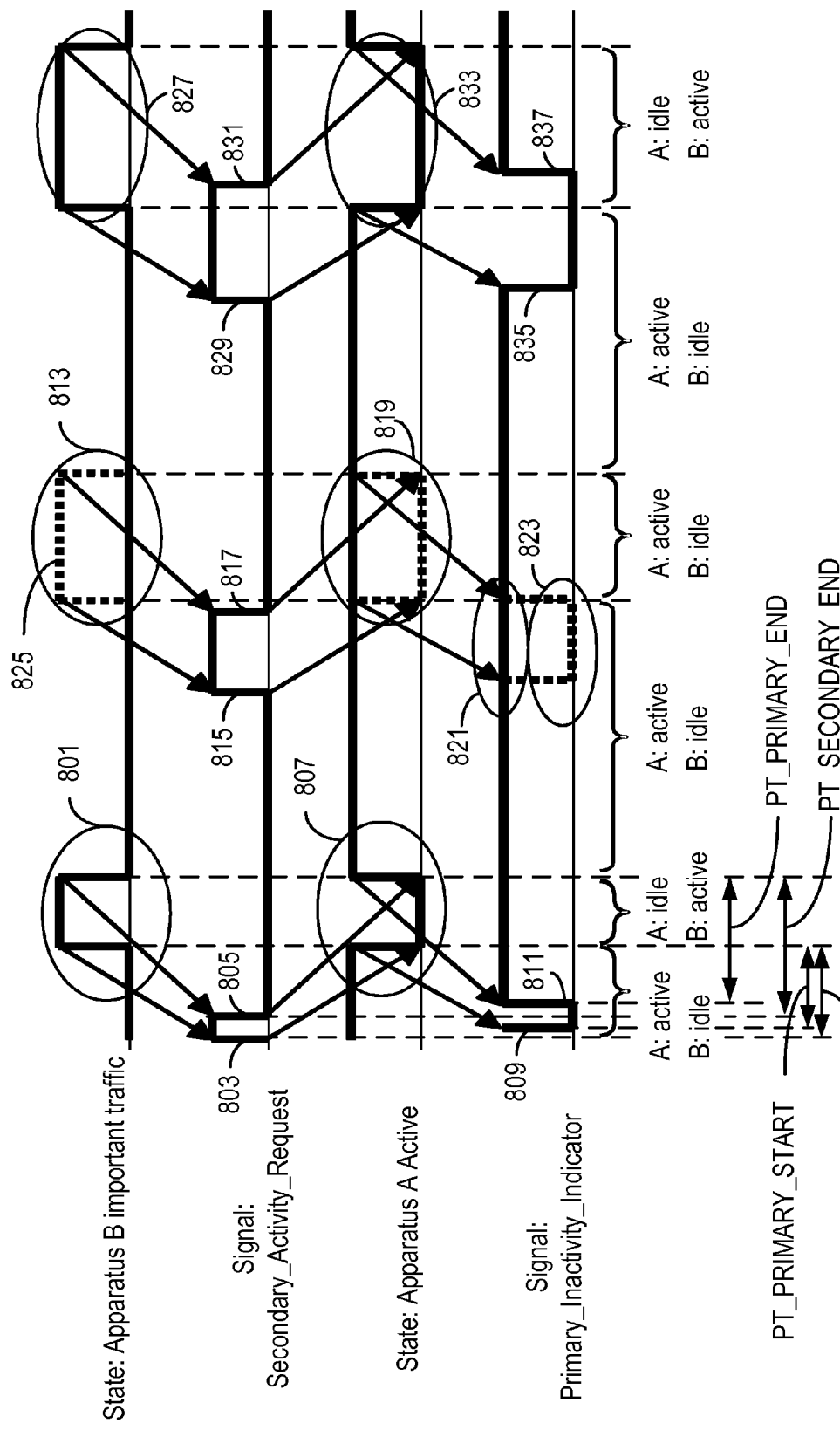
FIG. 8 is a signal/timing diagram illustrating some aspects of embodiments consistent with the invention in which a secondary apparatus is able to inform a primary apparatus of a need to perform activity, and thereby, if the primary apparatus grants the secondary apparatus' request, to be granted an opportunity to perform the activity without there arising any interference between the primary and secondary apparatuses.

FIG. 8 is another signal/timing diagram that shows the relationship between, on the one hand, a secondary apparatus ("Apparatus B") requesting time to perform one or more important activities, and a primary apparatus ("Apparatus A") granting those requests.

The top line illustrates a time-wise status of the Apparatus B with respect to whether Apparatus B is active or inactive at any moment with respect to only important activity, with periods of activity being represented by the Apparatus B important activity status being at a high logic level and periods of inactivity being represented by a low logic level.

The second line down from the top illustrates the Apparatus B's Secondary_Activity_Request signal, which was discussed above. This signal, when asserted at a high logic level, indicates at any given moment that the Apparatus B will have an important need to perform one or more important activities at a determinable future moment. Similarly, the Secondary_Activity_Request Indicator signal, when deasserted at a low logic level, indicates at any given moment that the Apparatus B will not have a need to perform any important activities at a determinable future moment. Accordingly, the moments of transition (e.g., from asserted to deasserted and from deasserted to asserted) are useful for signaling the duration of the Apparatus B's need to perform important activities.

The third line down from the top in the figure illustrates a time-wise status of the Apparatus A with respect to whether Apparatus A is active or inactive at any moment, with periods of activity being represented by the Apparatus A status being at a high logic level and periods of inactivity being represented by a low logic level.

The bottom line in the figure illustrates the Apparatus A's Primary_Inactivity_Indicator signal, which was discussed above. This signal, when deasserted at a high logic level, indicates at any given moment that the Apparatus A status will be "active" at a future moment. Similarly, the Primary_Inactivity_Indicator signal, when asserted at a low logic level, indicates at any given moment that the Apparatus A status will be "inactive" at a future determinable moment. Accordingly, the moments of transition (e.g., from asserted to deasserted and from deasserted to asserted) are useful for signaling when the Apparatus A's status will change.

Several aspects are illustrated in FIG. 8. In one of these, the Apparatus B knows that it will have an important need to perform important activity beginning at the start of period 801. Since the Apparatus B cannot schedule performance of this activity without the Apparatus A's agreement to remain inactive during this period of time, the Apparatus B asserts 803 its Secondary_Activity_Request signal in advance of the start of period 801 by an amount equal to PT_SECONDARY_START. In this example, the Apparatus B also knows for how long that important activity will last. Accordingly, the Apparatus B deasserts 805 the Secondary_Activity_Request signal in advance of the end of period 801 by an amount equal to PT_SECONDARY_END.

In this example, the Apparatus A decides to grant Apparatus B's request, and consequently schedules itself to remain inactive during a period 807 that coincides with the period 801 so that the Apparatus B can perform its important activity during the period 801. The Apparatus A signals this to Apparatus B in the manner described earlier, that is, by asserting 809 its Primary_Inactivity_Indicator signal in advance of the beginning of the period 807 by an amount equal to PT_PRIMARY_START, and by subsequently deasserting 811 its Primary_Inactivity_Indicator signal in advance of the beginning of the period 807 by an amount equal to PT_PRIMARY_END.

FIG. 8 also shows another example, in which the Apparatus B knows that it will have an important need to perform important activity beginning at the start of period 813. The Apparatus B accordingly asserts 815 its Secondary_Activity_Request signal in advance of the start of period 813 by an amount equal to PT_SECONDARY_START. In this example, the Apparatus B also knows for how long that important activity will last. Accordingly, the Apparatus B deasserts 817 the Secondary_Activity_Request signal in advance of the end of period 813 by an amount equal to PT_SECONDARY_END.

In this example, the Apparatus A decides not to grant Apparatus B's request, and consequently schedules itself to remain active during a period 819 that coincides with the period 813. The Apparatus A signals this to Apparatus B by virtue of its maintaining deassertion of the Primary_Inactivity_Indicator signal during the period 821. (The dashed line portion 823 of the Primary_Inactivity_Indicator signal shows the signaling that would have been performed had the Apparatus A instead decided to grant the Apparatus B's request.) Based on its monitoring of the Apparatus A's Primary_Inactivity_Indicator signal, the Apparatus B knows that it cannot (and therefore does not) perform its important (or any other) activity during the period 819, as illustrated by the dashed line 825.

FIG. 8 also shows another example, in which the Apparatus B knows that it will have a need to perform important activity beginning at the start of period 827. Since the Apparatus B cannot schedule performance of this activity without the Apparatus A's agreement to remain inactive during this period of time, the Apparatus B asserts 829 its Secondary_Activity_Request signal in advance of the start of period 827 by an amount equal to PT_SECONDARY_START. In this example, the Apparatus B also knows for how long that important activity will last. Accordingly, the Apparatus B deasserts 831 the Secondary_Activity_Request signal in advance of the end of period 827 by an amount equal to PT_SECONDARY_END.

In this example, the Apparatus A decides to grant Apparatus B's request, and consequently schedules itself to remain inactive during a period 833 that coincides with the period 827 so that the Apparatus B can perform its important activity during the period 827. The Apparatus A signals this to Apparatus B in the manner described earlier, that is, by asserting 835 its Primary_Inactivity_Indicator signal in advance of the beginning of the period 833 by an amount equal to PT_PRIMARY_START, and by subsequently deasserting 837 its Primary_Inactivity_Indicator signal in advance of the beginning of the period 833 by an amount equal to PT_PRIMARY_END. In this case, the Apparatus A did not know how long the period 827 would last before deciding to grant the Apparatus B's request, so deassertion 837 of the Primary_Inactivity_Indicator signal does not occur until after the beginning of the period 833 (as was also illustrated in FIG. 2c.)

The various embodiments described above exhibit a number of advantages over earlier mechanisms. One of these is that a very simple interface is used, whereby a single signal is capable not only of indicating whether an opportunity for a secondary apparatus to perform activities will be provided, but also of indicating the duration of this opportunity so that the secondary apparatus can make the best scheduling decisions.

Another advantage lies in that the signaling occurs in advance of the opportunity to perform activities, so that the secondary apparatus can schedule activities ahead of time, thereby not wasting time between the several apparatuses.

Yet another advantage lies in the secondary apparatus' capability to inform the primary apparatus of a need to perform important activity, thereby reducing its being locked out.

The invention has been described with reference to particular embodiments. However, it will be readily apparent to those skilled in the art that it is possible to embody the invention in specific forms other than those of the embodiment described above.

For example, the exemplary embodiments presented herein have been described in the context of radio communication apparatuses that cause disturbance in the form of radiofrequency (RF) transmissions. However, it should be understood that the apparatuses need not be operating in the same frequency in order for one to disturb the operation of the other. To the contrary, they may each use a different frequency range while still desensitizing each other (e.g., due to out-of-band emission, due to the high output power of one or both apparatuses, due to harmonics, etc.) The apparatuses need not even be radio communication apparatuses. For example, other embodiments in which the inventive aspects described above can be advantageously employed include situations in which the clock system of one apparatus disturbs the other while not at all sharing the same medium (e.g., one could be RF and the other a cabled link). The disturbance need not even be in the RF range; the above-described inventive aspects can be usefully employed in any situation in which an aggressor apparatus disturbs the operation of a victim apparatus.

In another example, the exemplary embodiments described above focus on the existence of two apparatuses whose concurrent operation causes at least one to interfere with the other. However, the various aspects of embodiments consistent with the invention can be adapted for use in environments involving more than one apparatus. For example, given any number of apparatuses for which it is desired prevent concurrent operation, the above-described signaling interface and control mechanism can, in some embodiments, be replicated between each pair of interfering apparatuses. In alternative embodiments, the above-described signaling interface and control mechanism is incorporated into two of the apparatuses (e.g., call them apparatus "A" and "B"), with remaining devices being connected to one of these. This connection can take any form, such as but not limited to firmware, or a dedicated hardware interface. The device to which the others is connected (e.g., assume it is apparatus B") then relays information between the above-described signaling interface (coupled at the other end to apparatus A) and the other apparatuses.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a primary apparatus, wherein activity of the primary apparatus causes interference that disturbs activity of a secondary apparatus or activity of the secondary apparatus causes interference that disturbs activity of the primary apparatus or activity of the primary apparatus causes interference that disturbs activity of the secondary apparatus and activity of the secondary apparatus causes interference that disturbs activity of the primary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the method comprising:

ascertaining a first future moment when an activity status of the primary apparatus will change from active to inactive;

ascertaining whether a duration of primary apparatus inactivity beginning at the first future moment will not be less than the best case minimum amount of time required by the secondary apparatus to perform activity; and in response to ascertaining that the duration of primary apparatus inactivity beginning at the first future moment will not be less than the best case minimum amount of time required by the secondary apparatus to perform activity, asserting a primary apparatus inactivity signal at a moment in advance of the first future moment, wherein the primary apparatus inactivity signal indicates upcoming primary apparatus inactivity scheduled to begin at the first future moment in time, wherein an amount of time between the moment in advance of the first future moment and the first future moment is equal to a primary pre-notice start time that is greater than or equal to the worst case minimum amount of time required by the secondary apparatus to perform activity minus the best case minimum amount of time required by the secondary apparatus to perform activity.

2. The method of claim 1, wherein the primary pre-notice start time is greater than or equal to a sum of a secondary apparatus activity scheduling time and the worst case minimum amount of time required by the secondary apparatus to perform activity minus the best case minimum amount of time required by the secondary apparatus to perform activity.

3. The method of claim 1, comprising:

ascertaining a second future moment when an activity status of the primary apparatus will change from inactive to active; and deasserting the primary apparatus inactivity signal at a moment in advance of the second future moment, wherein deassertion of the primary apparatus inactivity signal indicates upcoming primary apparatus activity scheduled to begin at the second future moment in time, wherein an amount of time between the moment in advance of the second future moment and the second future moment is equal to a primary pre-notice end time that is greater than or equal to a sum of the secondary apparatus activity scheduling time and the worst case minimum amount of time required by the secondary apparatus to perform activity.

4. The method of claim 1, wherein the primary pre-notice start time is greater than or equal to a sum of the secondary apparatus activity scheduling time and the worst case minimum amount of time required by the secondary apparatus to perform activity.

5. The method of claim 1, comprising:

detecting assertion of a secondary activity request signal that indicates a need for the secondary apparatus to become active at a third future moment; and scheduling the primary apparatus to become inactive at the third future moment in time, wherein an amount of time between detecting assertion of the secondary activity request signal and the third future moment in time is greater than or equal to an amount of time required for the primary apparatus to schedule the primary apparatus to become inactive at the third future moment in time.

6. The method of claim 5, comprising:

ascertaining whether to respond to the assertion of the secondary activity request signal by scheduling the primary apparatus to become inactive at the third future moment in time; and in response to ascertaining that the primary apparatus will respond to the assertion of the secondary activity request signal by scheduling the primary apparatus to become inactive at the third future moment in time, asserting the primary apparatus inactivity signal at a moment in advance of the third future moment.

7. The method of claim 6, comprising:

detecting deassertion of the secondary activity request signal that indicates that the secondary apparatus will be able to become inactive at a fourth future moment in time; and in response to detecting deassertion of the secondary activity request, enabling the primary apparatus to become active at or after the fourth future moment in time.

8. A method of operating a secondary apparatus, wherein activity of the secondary apparatus causes interference that disturbs activity of a primary apparatus or activity of the primary apparatus causes interference that disturbs activity of the secondary apparatus or activity of the secondary apparatus causes interference that disturbs activity of the primary apparatus and activity of the primary apparatus causes interference that disturbs activity of the secondary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the method comprising:

detecting assertion of a primary apparatus inactivity signal at a moment in advance of a first future moment, wherein the primary apparatus inactivity signal indicates upcoming primary apparatus inactivity scheduled to begin at the first future moment in time; and scheduling performance of at least one activity to begin at the first future moment in time.

9. The method of claim 8, comprising:

detecting deassertion of the primary apparatus status signal, wherein deassertion of the primary apparatus inactivity signal indicates upcoming primary apparatus activity scheduled to begin at a second future moment in time; and in response to detecting deassertion of the primary apparatus status signal, scheduling performance of a last activity that will end no later than the second future moment in time.

10. The method of claim 9, wherein:

assertion of the primary apparatus inactivity signal and deassertion of the primary apparatus inactivity signal are both detected prior to the first future moment in time; and the at least one activity scheduled to begin at the first future moment in time consists of one or more activities, each lasting no longer than the best case minimum amount of time required to perform activity.

11. The method of claim 9, wherein:

assertion of the primary apparatus inactivity signal and deassertion of the primary apparatus inactivity signal are both detected prior to the first future moment in time; and the at least one activity scheduled to begin at the first future moment in time consists of one activity that lasts no longer than the worst case minimum amount of time required to perform activity.

12. The method of claim 9, wherein:

deassertion of the primary apparatus inactivity signal is detected after the first future moment in time; and the last activity is an activity whose performance requires an amount of time equal to the worst case minimum amount of time required to perform activity.

13. The method of claim 8, comprising:

ascertaining that there exists a need to become active at a third future moment in time, and in response to said ascertaining, asserting a secondary activity request signal at a moment in advance of the third future moment in time, wherein an amount of time between the moment in advance of the third future moment in time and the third future moment in time is greater than or equal to a primary apparatus activity scheduling time.

14. The method of claim 13, comprising:

ascertaining that a need to be active will end at a fourth future moment in time, and in response to said ascertaining, deasserting the secondary activity request signal at a moment in advance of the fourth future moment in time, wherein an amount of time between the moment in advance of the fourth future moment in time and the fourth future moment in time is greater than or equal to the primary apparatus activity scheduling time.

15. The method of claim 13, comprising:

monitoring the primary apparatus inactivity signal to detect whether the primary apparatus will be inactive at the third future moment in time.

16. A control apparatus for operating a primary apparatus, wherein activity of the primary apparatus causes interference that disturbs activity of a secondary apparatus or activity of the secondary apparatus causes interference that disturbs activity of the primary apparatus or activity of the primary apparatus causes interference that disturbs activity of the secondary apparatus and activity of the secondary apparatus causes interference that disturbs activity of the primary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the control apparatus comprising:

circuitry configured to ascertain a first future moment when an activity status of the primary apparatus will change from active to inactive;

circuitry configured to ascertain whether a duration of primary apparatus inactivity beginning at the first future moment will not be less than the best case minimum amount of time required by the secondary apparatus to perform activity; and circuitry configured to, in response to ascertaining that the duration of primary apparatus inactivity beginning at the first future moment will not be less than the best case minimum amount of time required by the secondary apparatus to perform activity, assert a primary apparatus inactivity signal at a moment in advance of the first future moment, wherein the primary apparatus inactivity signal indicates upcoming primary apparatus inactivity scheduled to begin at the first future moment in time, wherein an amount of time between the moment in advance of the first future moment and the first future moment is equal to a primary pre-notice start time that is greater than or equal to the worst case minimum amount of time required by the secondary apparatus to perform activity minus the best case minimum amount of time required by the secondary apparatus to perform activity.

17. The control apparatus of claim 16, wherein the primary pre-notice start time is greater than or equal to a sum of a secondary apparatus activity scheduling time and the worst case minimum amount of time required by the secondary apparatus to perform activity minus the best case minimum amount of time required by the secondary apparatus to perform activity.

18. The control apparatus of claim 16, comprising:

circuitry configured to ascertain a second future moment when an activity status of the primary apparatus will change from inactive to active; and circuitry configured to deassert the primary apparatus inactivity signal at a moment in advance of the second future moment, wherein deassertion of the primary apparatus inactivity signal indicates upcoming primary apparatus activity scheduled to begin at the second future moment in time, wherein an amount of time between the moment in advance of the second future moment and the second future moment is equal to a primary pre-notice end time that is greater than or equal to a sum of the secondary apparatus activity scheduling time and the worst case minimum amount of time required by the secondary apparatus to perform activity.

19. The control apparatus of claim 16, wherein the primary pre-notice start time is greater than or equal to a sum of the secondary apparatus activity scheduling time and the worst case minimum amount of time required by the secondary apparatus to perform activity.

20. The control apparatus of claim 16, comprising:
circuitry configured to detect assertion of a secondary activity request signal that indicates a need for the secondary apparatus to become active at a third future moment; and
circuitry configured to schedule the primary apparatus to become inactive at the third future moment in time,
wherein an amount of time between detecting assertion of the secondary activity request signal and the third future moment in time is greater than or equal to an amount of time required for the primary apparatus to schedule the primary apparatus to become inactive at the third future moment in time.

21. The control apparatus of claim 20, comprising:
circuitry configured to ascertain whether to respond to the assertion of the secondary activity request signal by scheduling the primary apparatus to become inactive at the third future moment in time; and
circuitry configured to assert the primary apparatus inactivity signal at a moment in advance of the third future moment in response to ascertaining that the primary apparatus will respond to the assertion of the secondary activity request signal by scheduling the primary apparatus to become inactive at the third future moment in time.

22. The control apparatus of claim 21, comprising:
circuitry configured to detect deassertion of the secondary activity request signal that indicates that the secondary apparatus will be able to become inactive at a fourth future moment in time; and
circuitry configured to enable the primary apparatus to become active at or after the fourth future moment in time in response to detecting deassertion of the secondary activity request.

23. A control apparatus for operating a secondary apparatus, wherein activity of the secondary apparatus causes interference that disturbs activity of a primary apparatus or activity of the primary apparatus causes interference that disturbs activity of the secondary apparatus or activity of the secondary apparatus causes interference that disturbs activity of the primary apparatus and activity of the primary apparatus causes interference that disturbs activity of the secondary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the control apparatus comprising:
circuitry configured to detect assertion of a primary apparatus inactivity signal at a moment in advance of a first future moment, wherein the primary apparatus inactivity signal indicates upcoming primary apparatus inactivity scheduled to begin at the first future moment in time; and
circuitry configured to schedule performance of at least one activity to begin at the first future moment in time.

24. The control apparatus of claim 23, comprising:
circuitry configured to detect deassertion of the primary apparatus status signal, wherein deassertion of the primary apparatus inactivity signal indicates upcoming primary apparatus activity scheduled to begin at a second future moment in time; and
circuitry configured to schedule performance of a last activity that will end no later than the second future moment in time in response to detecting deassertion of the primary apparatus status signal.

25. The control apparatus of claim 24, wherein:
assertion of the primary apparatus inactivity signal and deassertion of the primary apparatus inactivity signal are both detected prior to the first future moment in time; and
the at least one activity scheduled to begin at the first future moment in time consists of one or more activities, each lasting no longer than the best case minimum amount of time required to perform activity.

26. The control apparatus of claim 24, wherein:
assertion of the primary apparatus inactivity signal and deassertion of the primary apparatus inactivity signal are both detected prior to the first future moment in time; and
the at least one activity scheduled to begin at the first future moment in time consists of one activity that lasts no longer than the worst case minimum amount of time required to perform activity.

27. The control apparatus of claim 24, wherein:
deassertion of the primary apparatus inactivity signal is detected after the first future moment in time; and
the last activity is an activity whose performance requires an amount of time equal to the worst case minimum amount of time required to perform activity.

28. The control apparatus of claim 23, comprising:
circuitry configured to ascertain that there exists a need to become active at a third future moment in time, and to assert a secondary activity request signal at a moment in advance of the third future moment in time in response to said ascertaining,
wherein an amount of time between the moment in advance of the third future moment in time and the third future moment in time is greater than or equal to a primary apparatus activity scheduling time.

29. The control apparatus of claim 28, comprising:
circuitry configured to ascertain that a need to be active will end at a fourth future moment in time, and to deassert the secondary activity request signal at a moment in advance of the fourth future moment in time in response to said ascertaining,
wherein an amount of time between the moment in advance of the fourth future moment in time and the fourth future moment in time is greater than or equal to the primary apparatus activity scheduling time.

30. The control apparatus of claim 28, comprising:
circuitry configured to monitor the primary apparatus inactivity signal to detect whether the primary apparatus will be inactive at the third future moment in time.

31. A nontransitory processor readable storage medium having stored therein a set of instructions that, when executed by a processor, cause the processor to perform a method of operating a primary apparatus, wherein activity of the primary apparatus causes interference that disturbs activity of a secondary apparatus or activity of the secondary apparatus causes interference that disturbs activity of the primary apparatus or activity of the primary apparatus causes interference that disturbs activity of the secondary apparatus and activity of the secondary apparatus causes interference that disturbs activity of the primary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the method comprising:

ascertaining a first future moment when an activity status of the primary apparatus will change from active to inactive;
  ascertaining whether a duration of primary apparatus inactivity beginning at the first future moment will not be less than the best case minimum amount of time required by the secondary apparatus to perform activity; and
  in response to ascertaining that the duration of primary apparatus inactivity beginning at the first future moment will not be less than the best case minimum amount of time required by the secondary apparatus to perform activity, asserting a primary apparatus inactivity signal at a moment in advance of the first future moment, wherein the primary apparatus inactivity signal indicates upcoming primary apparatus inactivity scheduled to begin at the first future moment in time,
  wherein an amount of time between the moment in advance of the first future moment and the first future moment is equal to a primary pre-notice start time that is greater than or equal to the worst case minimum amount of time required by the secondary apparatus to perform activity minus the best case minimum amount of time required by the secondary apparatus to perform activity.

32. A nontransitory processor readable storage medium having stored therein a set of instructions that, when executed by a processor, cause the processor to perform a method of operating a secondary apparatus, wherein activity of the secondary apparatus causes interference that disturbs activity of a primary apparatus or activity of the primary apparatus causes interference that disturbs activity of the secondary apparatus or activity of the secondary apparatus causes interference that disturbs activity of the primary apparatus and activity of the primary apparatus causes interference that disturbs activity of the secondary apparatus, wherein the secondary apparatus is characterized by a best case minimum amount of time required to perform activity and also by a worst case minimum amount of time required to perform activity, wherein the worst case minimum amount of time required to perform activity is greater than or equal to the best case minimum amount of time required to perform activity, the method comprising:

detecting assertion of a primary apparatus inactivity signal at a moment in advance of a first future moment, wherein the primary apparatus inactivity signal indicates upcoming primary apparatus inactivity scheduled to begin at the first future moment in time; and
  scheduling performance of at least one activity to begin at the first future moment in time.

* * * * *